United States Patent
Petry et al.

(10) Patent No.: US 10,027,700 B2
(45) Date of Patent: *Jul. 17, 2018

(54) SECURE ANALYSIS APPLICATION FOR ACCESSING WEB RESOURCES VIA URL FORWARDING

(71) Applicant: Authentic8, Inc., Mountain View, CA (US)

(72) Inventors: Scott M. Petry, Portola Valley, CA (US); Ramesh Rajagopal, Los Altos, CA (US); Peter K. Lund, San Francisco, CA (US); Fredric L. Cox, San Jose, CA (US); Adam P. Moore, San Francisco, CA (US); Leslie L. Dunston, Foster City, CA (US); Varley H. Taylor, San Francisco, CA (US); Zachary L. Segal, San Francisco, CA (US); Luka I. Stolyarov, San Francisco, CA (US); Joshua R. McMains, Morgan Hill, CA (US); Brian T. Zaugg, Campbell, CA (US)

(73) Assignee: Authentic8, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,915

(22) Filed: Mar. 9, 2017

(65) Prior Publication Data

US 2017/0180413 A1    Jun. 22, 2017

Related U.S. Application Data

(63) Continuation-in-part of application No. 15/395,914, filed on Dec. 30, 2016, which is a continuation of
(Continued)

(51) Int. Cl.
*H04L 29/06* (2006.01)
*H04L 29/08* (2006.01)

(52) U.S. Cl.
CPC ...... *H04L 63/1433* (2013.01); *H04L 63/0209* (2013.01); *H04L 63/0428* (2013.01);
(Continued)

(58) Field of Classification Search
CPC ... H04L 63/1433; H04L 63/123; H04L 63/10; H04L 63/0876; H04L 63/083; H04L 63/0209; H04L 67/02; H04L 67/2814
See application file for complete search history.

(56) References Cited

U.S. PATENT DOCUMENTS

| 8,306,807 B2 | 11/2012 | Van Guilder et al. |
| 8,332,626 B2 | 12/2012 | Mansfield |

(Continued)

FOREIGN PATENT DOCUMENTS

| EP | 1233333 A1 | 8/2002 |
| WO | 2008-156924 A1 | 12/2008 |

OTHER PUBLICATIONS

International Search Report and the Written Opinion of the International Searching Authority for co-pending PCT Application No. PCT/US2016/018828, dated Jun. 8, 2016, 10 pages.

(Continued)

*Primary Examiner* — Chau Le
(74) *Attorney, Agent, or Firm* — Baker & McKenzie LLP

(57) ABSTRACT

Embodiments described herein may be directed to systems, methods, apparatuses, devices, computer program products, computer-executable instructions, and/or applications for securely and anonymously accessing web resources and customizable attribution of identity. In accordance with the present disclosure, a user may inspect and analyze a webpage as well as the underlying source code from an "arm's
(Continued)

length" using a secure analysis application to prevent exposure on the user's local machine. The secure analysis application may provide increased flexibility in masking and/or modifying the user's digital persona to external websites. Additionally, the secure analysis application may be integrated with a translation service to translate textual web content without the web content provider being alerted that a translation is taking place.

20 Claims, 7 Drawing Sheets

Related U.S. Application Data application No. 15/049,075, filed on Feb. 20, 2016, now Pat. No. 9,537,873.

(60) Provisional application No. 62/118,862, filed on Feb. 20, 2015.

(52) U.S. Cl.
CPC ........ *H04L 63/083* (2013.01); *H04L 63/0876* (2013.01); *H04L 63/10* (2013.01); *H04L 63/123* (2013.01); *H04L 67/02* (2013.01); *H04L 67/2814* (2013.01)

(56) References Cited

U.S. PATENT DOCUMENTS

| | | | |
|---|---|---|---|
| 8,375,434 B2 | 2/2013 | Cottrell et al. | |
| 8,615,795 B2 | 12/2013 | Cottrell et al. | |
| 9,075,895 B2 | 7/2015 | Lindsey et al. | |
| 9,306,972 B2 | 4/2016 | Amiga | |
| 9,313,227 B2 | 4/2016 | Amiga | |
| 9,521,118 B2 | 12/2016 | Cottrell et al. | |
| 9,537,873 B2 | 1/2017 | Petry et al. | |
| 9,712,386 B1* | 7/2017 | Chen .................. | H04L 41/0806 |
| 9,787,637 B2 | 10/2017 | Petry et al. | |
| 2003/0050932 A1 | 3/2003 | Pace et al. | |
| 2003/0135543 A1 | 7/2003 | Kittredge et al. | |
| 2004/0049702 A1* | 3/2004 | Subramaniam ...... | G06Q 20/382 726/28 |
| 2004/0107360 A1* | 6/2004 | Herrmann .............. | H04L 63/08 726/1 |
| 2005/0097353 A1 | 5/2005 | Patrick et al. | |
| 2007/0115990 A1* | 5/2007 | Asati ..................... | H04L 45/00 370/392 |
| 2007/0214359 A1* | 9/2007 | Williamson ........ | H04L 63/0272 713/163 |
| 2010/0125902 A1* | 5/2010 | Killian ................ | H04L 63/0272 726/15 |
| 2011/0247045 A1* | 10/2011 | Rajagopal ............. | H04L 63/08 726/1 |
| 2013/0014259 A1 | 1/2013 | Gribble et al. | |
| 2013/0290404 A1 | 10/2013 | Rajabi et al. | |
| 2013/0335436 A1 | 12/2013 | Lindsey | |
| 2013/0340028 A1* | 12/2013 | Rajagopal ............. | H04L 63/08 726/1 |
| 2015/0106683 A1 | 4/2015 | Lindsey et al. | |
| 2015/0222600 A1 | 8/2015 | Cottrell et al. | |
| 2016/0352803 A1 | 12/2016 | Amiga et al. | |
| 2017/0034190 A1* | 2/2017 | May ................... | H04L 63/1416 |
| 2017/0111318 A1 | 4/2017 | Petry et al. | |
| 2018/0034773 A1 | 2/2018 | Petry et al. | |

OTHER PUBLICATIONS

Koved, Larry, et al. "Security challenges for Enterprise Java in an e-business environment.", Retrieved from http://ieeexplore.ieee.org/stamp/stamp.jsp?arnumber=5386964, IBM Systems Journal 40.1 (2001): 130-152, Published 2001.
Guitart, Jordi et al. "Characterizing secure dynamic web applications scalability.", Retrieved from http://ieeexplore.ieee.org/stamp/stamp.jsp?arnumber=1419933, 19th IEEE International Parallel and Distributed Processing Symposium, IEEE, Published 2005.
Petry et al., U.S. Pat. No. 9,787,637, 332 pages.
Petry et al., U.S. Pat. No. 9,537,873, 151 pages.

* cited by examiner

SECURE ANALYSIS APPLICATION FOR ACCESSING WEB RESOURCES VIA URL FORWARDING

CROSS REFERENCE TO RELATED APPLICATIONS

This application is a continuation-in-part (CIP) application of, and claims priority to, U.S. patent application Ser. No. 15/395,914 filed on Dec. 30, 2016, which is a continuation application of, and claims priority to, U.S. patent application Ser. No. 15/049,075 filed on Feb. 20, 2016, which is a nonprovisional application of, and claims priority to, U.S. Provisional Patent Application No. 62/118,862 filed on Feb. 20, 2015, all disclosures of which are hereby incorporated by reference in entirety.

TECHNICAL FIELD

Embodiments disclosed herein relate to a secure analysis application for accessing web resources via URL forwarding.

BACKGROUND

When a user navigates an unsecure network such as the World Wide Web (e.g., the Internet), the user may be exposed to a variety of data security risks. For example, a webpage visited by the user may undesirably identify location and/or identity information of the user, which may be used maliciously by the webpage. Accordingly, a need exists for increased web browsing security.

SUMMARY

In some embodiments, a computing apparatus is provided. The computing apparatus defines a first location in a network and comprises: at least one memory comprising instructions; and at least one processing device configured for executing the instructions, wherein the instructions cause the at least one processing device to perform the operations of: establishing, using a secure analysis application comprised in the at least one memory, a web browsing session with the network; selecting, using a traffic routing unit comprised in the at least one processing device, a secure web container through which web content is to be accessed during the web browsing session, wherein the secure web container defines a second location in the network different than the first location; selecting, using the traffic routing unit, an egress node through which the web content is to be routed during the web browsing session, wherein the egress node defines a third location in the network different than the first location and the second location; and displaying, using a graphical processing unit (GPU) comprised in the at least one processing device, the web content to a user of the computing apparatus.

In some embodiments, the instructions further cause the at least one processing device to perform the operations of: generating, using a content management unit of the at least one processing device, a request to receive, at the secure web container, the web content from a web server; and transmitting, using the traffic routing unit, the request to the secure web container, wherein the request is transmitted to the web server from the secure web container via the network by routing the request through the egress node, and wherein the web server is unable to determine at least one of the first location and the second location.

In some embodiments, the web content is received at the secure web container from the web server via the network in response to transmitting the request to the web server, and wherein the web server defines a fourth location in the network different than the first location, the second location, and the third location.

In some embodiments, the instructions further cause the at least one processing device to perform the operations of: identifying, using a translation unit associated with the secure web container, text comprised in the web content, wherein the text defines a first language; extracting, using the translation unit, the text from the web context; transmitting, using the translation unit, the text to a translation service for translation, wherein the translation service is unable to determine the fourth location; and receiving, using the translation unit and at the secure web container, translated text defining a second language different than the first language, wherein displaying the web content to the user of the computing apparatus comprises accessing the translated text using the translation unit.

In some embodiments, the instructions further cause the at least one processing device to perform the operations of: storing, using a storage mapping unit associated with the secure web container, at least one of the web content, the text, and the translated text in a cloud-based storage platform.

In some embodiments, selecting the secure web container comprises selecting two or more secure web containers through which the web content is to be accessed, and wherein each of the two or more secure web containers defines a different location in the network.

In some embodiments, selecting the egress node comprises selecting two or more egress nodes through which the web content is to be routed, and wherein each of the two or more egress nodes defines a different location in the network.

In some embodiments, a non-transitory computer readable medium is provided. The non-transitory computer readable medium defines a first location in a network and comprises code is provided, wherein the code, when executed by at least one processing device of a computing apparatus, causes the at least one processing device to perform the operations of: establishing, using a secure analysis application comprised in the at least one memory, a web browsing session with the network; selecting, using a traffic routing unit comprised in the at least one processing device, a secure web container through which web content is to be accessed during the web browsing session, wherein the secure web container defines a second location in the network different than the first location; selecting, using the traffic routing unit, an egress node through which the web content is to be routed during the web browsing session, wherein the egress node defines a third location in the network different than the first location and the second location; and displaying, using a graphical processing unit (GPU) comprised in the at least one processing device, the web content to a user of the computing apparatus.

In some embodiments, the non-transitory computer readable medium further comprises code that, when executed by the at least one processing device of the video content server, causes the at least one processing device to perform the operations of: generating, using a content management unit of the at least one processing device, a request to receive, at the secure web container, the web content from a web server; and transmitting, using the traffic routing unit, the request to the secure web container, wherein the request is transmitted to the web server from the secure web container via the network by routing the request through the egress node, and wherein the web server is unable to determine at least one of the first location and the second location.

In some embodiments, the web content is received at the secure web container from the web server via the network in response to transmitting the request to the web server, and wherein the web server defines a fourth location in the network different than the first location, the second location, and the third location.

In some embodiments, the non-transitory computer readable medium further comprises code that, when executed by the at least one processing device of the video content server, causes the at least one processing device to perform the operations of: identifying, using a translation unit associated with the secure web container, text comprised in the web content, wherein the text defines a first language; extracting, using the translation unit, the text from the web context; transmitting, using the translation unit, the text to a translation service for translation, wherein the translation service is unable to determine the fourth location; and receiving, using the translation unit and at the secure web container, translated text defining a second language different than the first language, wherein displaying the web content to the user of the computing apparatus comprises accessing the translated text using the translation unit.

In some embodiments, the non-transitory computer readable medium further comprises code that, when executed by the at least one processing device of the video content server, causes the at least one processing device to perform the operations of: storing, using a storage mapping unit associated with the secure web container, at least one of the web content, the text, and the translated text in a cloud-based storage platform.

In some embodiments, selecting the secure web container comprises selecting two or more secure web containers through which the web content is to be accessed, and wherein each of the two or more secure web containers defines a different location in the network.

In some embodiments, selecting the egress node comprises selecting two or more egress nodes through which the web content is to be routed, and wherein each of the two or more egress nodes defines a different location in the network.

In some embodiments, a method is provided. The method comprises: establishing, using a secure analysis application comprised in at least one memory of a computing apparatus defining a first location in a network, a web browsing session with the network; selecting, using a traffic routing unit comprised in at least one processing device of the computing apparatus, a secure web container through which web content is to be accessed during the web browsing session, wherein the secure web container defines a second location in the network different than the first location; selecting, using the traffic routing unit, an egress node through which the web content is to be routed during the web browsing session, wherein the egress node defines a third location in the network different than the first location and the second location; and displaying, using a graphical processing unit (GPU) comprised in the at least one processing device, the web content to a user of the computing apparatus.

In some embodiments, the method further comprises: generating, using a content management unit of the at least one processing device, a request to receive, at the secure web container, the web content from a web server; transmitting, using the traffic routing unit, the request to the secure web container; transmitting, from the secure web container and using a second traffic routing unit associated with the secure web container, the request to the web server via the network by routing the request through the egress node, wherein the web server is unable to determine at least one of the first location and the second location.

In some embodiments, the method further comprises: receiving, using the second traffic routing unit, the web content at the secure web container from the web server via the network in response to transmitting the request to the web server, wherein the web server defines a fourth location in the network different than the first location, the second location, and the third location.

In some embodiments, the method further comprises: identifying, using a translation unit associated with the secure web container, text comprised in the web content, wherein the text defines a first language; extracting, using the translation unit, the text from the web context; transmitting, using the translation unit, the text to a translation service for translation, wherein the translation service is unable to determine the fourth location; and receiving, using the translation unit and at the secure web container, translated text defining a second language different than the first language, wherein displaying the web content to the user of the computing apparatus comprises accessing the translated text using the translation unit.

In some embodiments, selecting the secure web container comprises selecting two or more secure web containers through which the web content is to be accessed, and wherein each of the two or more secure web containers defines a different location in the network.

In some embodiments, selecting the egress node comprises selecting two or more egress nodes through which the web content is to be routed, and wherein each of the two or more egress nodes defines a different location in the network.

In some embodiments, a computing apparatus defining a first location in a network is provided, wherein the computing apparatus comprises: at least one memory comprising instructions; and at least one processing device configured for executing the instructions, wherein the instructions cause the at least one processing device to perform the operations of: receiving, by an input/output (I/O) unit of the computing apparatus, a request for web content; determining, by a secure analysis application, the requested web content is potentially harmful to the computing apparatus; transmitting, by a communication unit of the computing apparatus, a web address associated with the requested web content to a secure web container defining a second location in the network, wherein the secure web container uses the web address to retrieve the requested web content from a web server; and providing, in a secure browser window associated with the secure analysis application and at the computing apparatus, access to the requested web content via an encrypted communication connection established between the computing apparatus and the secure web container, wherein the requested web content is rendered by the secure web container so that the computing apparatus is not exposed to the rendered web content.

In some embodiments, the instructions further cause the at least one processing device to perform the operations of: selecting, by the secure analysis application, the secure web container from a plurality of secure web containers and an egress node defining a third location in the network from a plurality of egress nodes based at least in part on the requested web content; initializing, by the secure analysis application, the secure web container for retrieving the requested web content via the egress node; and establishing, by the communication unit, the encrypted communication connection between the computing apparatus and the secure web container, wherein the web address associated with the requested web content is transmitted from the computing apparatus to the secure web container via the encrypted communication connection.

In some embodiments, the secure web container comprises multiple secure web containers each defining different locations in the network, wherein the egress node comprises multiple egress nodes each defining different locations in the network, and wherein each secure web container and egress node is utilized to retrieve the requested web content from the web server.

In some embodiments, the request for web content is received at the computing apparatus in an unsecure browser window different from the secure web browser window.

In some embodiments, determining the requested web content is potentially harmful to the computing apparatus comprises: identifying, using the secure analysis application, the web address associated with the requested web content; comparing, using the secure analysis application, the identified web address to a plurality of web addresses associated with potentially harmful web content; and determining, using the secure analysis application, at least a partial match between the identified web address and the plurality of web addresses associated with potentially harmful web content.

In some embodiments, determining the requested web content is potentially harmful to the computing apparatus comprises: identifying, using the secure analysis application, the web address associated with the requested web content; comparing, using the secure analysis application, the identified web address to a plurality of web addresses associated with safe web content; determining, using the secure analysis application, no match between the identified web address and the plurality of web addresses associated with safe web content; and adding, using the secure analysis application, the identified web address to a database comprising the plurality of web addresses associated with potentially harmful web content.

In some embodiments, determining the requested web content is potentially harmful to the computing apparatus comprises: determining, using the secure analysis application, a risk level associated with the requested web content; comparing, using the secure analysis application, the determined risk level to a threshold value associated with an accepted risk level; and determining, using the secure analysis application, the determined risk level exceeds the threshold value.

In some embodiments, a non-transitory computer readable medium comprising code is provided, wherein the code, when executed by at least one processing device of a computing apparatus defining a first location in a network, causes the at least one processing device to perform the operations of: receiving, by an input/output (I/O) unit of the computing apparatus, a request for web content; determining, by a secure analysis application, the requested web content is potentially harmful to the computing apparatus; transmitting, by a communication unit of the computing apparatus, a web address associated with the requested web content to a secure web container defining a second location in the network, wherein the secure web container uses the web address to retrieve the requested web content from a web server; and providing, in a secure browser window associated with the secure analysis application and at the computing apparatus, access to the requested web content via an encrypted communication connection established between the computing apparatus and the secure web container, wherein the requested web content is rendered by the secure web container so that the computing apparatus is not exposed to the rendered web content.

In some embodiments, the non-transitory computer readable medium further comprises code that, when executed by the at least one processing device of the computing apparatus, causes the at least one processing device to perform the operations of: selecting, by the secure analysis application, the secure web container from a plurality of secure web containers and an egress node defining a third location in the network from a plurality of egress nodes based at least in part on the requested web content; initializing, by the secure analysis application, the secure web container for retrieving the requested web content via the egress node; and establishing, by the communication unit, the encrypted communication connection between the computing apparatus and the secure web container, wherein the web address associated with the requested web content is transmitted from the computing apparatus to the secure web container via the encrypted communication connection.

In some embodiments, the secure web container comprises multiple secure web containers each defining different locations in the network, wherein the egress node comprises multiple egress nodes each defining different locations in the network, and wherein each secure web container and egress node is utilized to retrieve the requested web content from the web server.

In some embodiments, the request for web content is received at the computing apparatus in an unsecure browser window different from the secure web browser window.

In some embodiments, the code that, when executed by the at least one processing device of the computing apparatus, causes the at least one processing device to perform the operation of determining the requested web content is potentially harmful to the computing apparatus further comprises code that, when executed by the at least one processing device of the computing apparatus, causes the at least one processing device to perform the operations of: identifying, using the secure analysis application, the web address associated with the requested web content; comparing, using the secure analysis application, the identified web address to a plurality of web addresses associated with potentially harmful web content; and determining, using the secure analysis application, at least a partial match between the identified web address and the plurality of web addresses associated with potentially harmful web content.

In some embodiments, the code that, when executed by the at least one processing device of the computing apparatus, causes the at least one processing device to perform the operation of determining the requested web content is potentially harmful to the computing apparatus further comprises code that, when executed by the at least one processing device of the computing apparatus, causes the at least one processing device to perform the operations of: identifying, using the secure analysis application, the web address associated with the requested web content; comparing, using the secure analysis application, the identified web address to a plurality of web addresses associated with safe web content; determining, using the secure analysis application, no match between the identified web address and the plurality of web addresses associated with safe web content; and adding, using the secure analysis application, the identified web address to a database comprising the plurality of web addresses associated with potentially harmful web content.

In some embodiments, the code that, when executed by the at least one processing device of the computing apparatus, causes the at least one processing device to perform the operation of determining the requested web content is potentially harmful to the computing apparatus further comprises code that, when executed by the at least one processing device of the computing apparatus, causes the at least one processing device to perform the operations of: determining, using the secure analysis application, a risk level associated with the requested web content; comparing, using the secure analysis application, the determined risk level to a threshold value associated with an accepted risk level; and determining, using the secure analysis application, the determined risk level exceeds the threshold value.

In some embodiments, a method is provided, wherein the method comprises: receiving, by an input/output (I/O) unit of a computing apparatus defining a first location in a network, a request for web content; determining, by a secure analysis application, the requested web content is potentially harmful to the computing apparatus; transmitting, by a communication unit of the computing apparatus, a web address associated with the requested web content to a secure web container defining a second location in the network, wherein the secure web container uses the web address to retrieve the requested web content from a web server; and providing, in a secure browser window associated with the secure analysis application and at the computing apparatus, access to the requested web content via an encrypted communication connection established between the computing apparatus and the secure web container, wherein the requested web content is rendered by the secure web container so that the computing apparatus is not exposed to the rendered web content.

In some embodiments, the method further comprises: selecting, by the secure analysis application, the secure web container from a plurality of secure web containers and an egress node defining a third location in the network from a plurality of egress nodes based at least in part on the requested web content; initializing, by the secure analysis application, the secure web container for retrieving the requested web content via the egress node; and establishing, by the communication unit, the encrypted communication connection between the computing apparatus and the secure web container, wherein the web address associated with the requested web content is transmitted from the computing apparatus to the secure web container via the encrypted communication connection.

In some embodiments, the secure web container comprises multiple secure web containers each defining different locations in the network, wherein the egress node comprises multiple egress nodes each defining different locations in the network, and wherein each secure web container and egress node is utilized to retrieve the requested web content from the web server.

In some embodiments, the request for web content is received at the computing apparatus in an unsecure browser window different from the secure web browser window.

In some embodiments, determining the requested web content is potentially harmful to the computing apparatus comprises: identifying, using the secure analysis application, the web address associated with the requested web content; comparing, using the secure analysis application, the identified web address to a plurality of web addresses associated with potentially harmful web content; and determining, using the secure analysis application, at least a partial match between the identified web address and the plurality of web addresses associated with potentially harmful web content.

In some embodiments, determining the requested web content is potentially harmful to the computing apparatus comprises: identifying, using the secure analysis application, the web address associated with the requested web content; comparing, using the secure analysis application, the identified web address to a plurality of web addresses associated with safe web content; determining, using the secure analysis application, no match between the identified web address and the plurality of web addresses associated with safe web content; and adding, using the secure analysis application, the identified web address to a database comprising the plurality of web addresses associated with potentially harmful web content.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Introduction

Embodiments described herein may be directed to systems, methods, apparatuses, devices, computer program products, computer-executable instructions, and/or applications for securely and anonymously accessing web resources and customizable attribution of identity. In accordance with the present disclosure, a user may inspect and analyze a webpage as well as the underlying source code from an "arm's length" using a secure analysis application to prevent exposure on the user's local machine. The secure analysis application may provide increased flexibility in masking and/or modifying the user's digital persona to external websites.

Further in accordance with the present disclosure, the secure analysis application may be integrated with a translation service to translate textual web content without the web content provider being alerted that a translation is taking place. The secure analysis application may additionally or alternatively be integrated with a temporal and/or persistent cloud-based storage platform that allows data to be stored between sessions and selectively shared among users in an organization.

System Operation

Figure 1A:
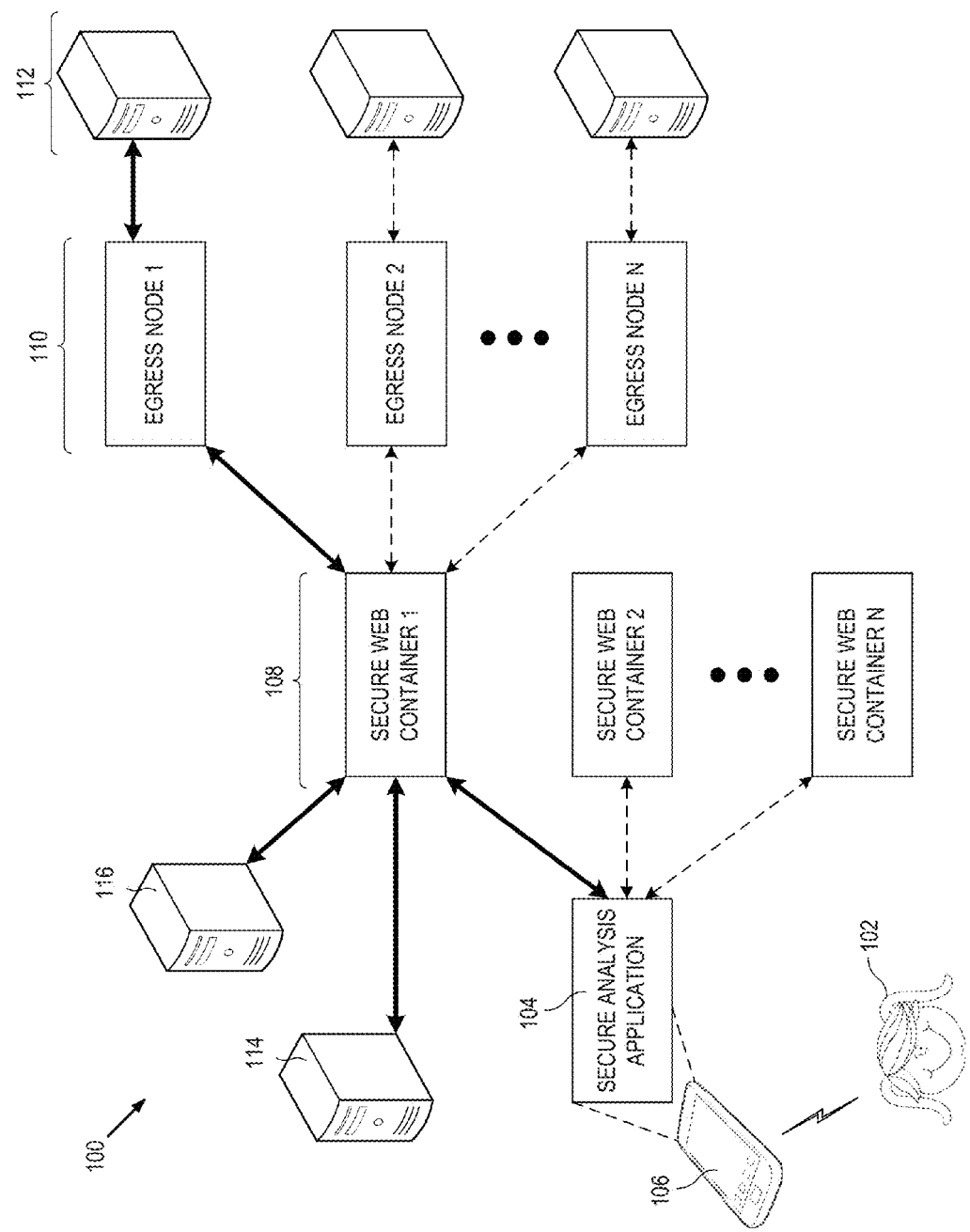
FIG. 1A shows an exemplary system for providing a secure web browsing experience, in accordance with some embodiments of the disclosure.

Referring now to the Figures, FIG. 1A shows an exemplary system 100 for providing a user 102 with a secure and anonymous web browsing experience as described herein. Using a secure analysis application 104 (e.g., a web browser application) running on a user device 106, the user 102 may initiate a secure web browsing session to access web content via a network (e.g., the Internet). In some embodiments, initiating a secure web browsing session includes establishing a communication connection between the user device 106 and one or more other devices based at least in part on one or more wireless and/or wired communication protocols as described herein.

During the secure web browsing session and via the secure analysis application 104, the user 102 may select one or more secure web containers 108 (e.g., separate web browsers each having a different location (e.g., Internet Protocol (IP) address) and/or identity (e.g., device identification number) than the secure analysis application 104 and/or the user device 106 in the network) through which the web content may be accessed by the user 102. In this way, the one or more secure web containers 108 may serve as separate and secure proxy web browsers for providing the user 202 with the web content while insulating the secure analysis application 104 and/or the user device 106 (and thus the user 102) from unwanted location and/or identity exposure in the network.

Additionally, during the secure web browsing session, the user 102 may select one or more egress nodes 110 (e.g., router outputs through which an IP data packet (e.g., the web content) enters a public network such as the Internet (e.g., the network)) through which the web content, as well as any other data transmitted and/or received during the secure web browsing session, is to be routed. The one or more egress nodes 110 may each have a different location and/or identity than the secure analysis application 104, the user device 106, and/or the one or more secure web containers 108 in the network. As such, selecting the one or more egress nodes 110 through which web content is to be routed provides an additional layer of security and anonymity.

For example, when the user 102 accesses the web content via the secure analysis application 104, a selected secure web container 108 (e.g., secure web container 1 of FIG. 1A), and a selected egress node 110 (e.g., egress node 1 of FIG. 1A), only the identity and/or the location of the selected egress node 110 may be exposed in the network (as opposed to the location and/or the identity of the secure analysis application 104, the user device 106, and/or the selected secure web container 108). By not sharing the location and/or the identity of the secure analysis application 104, the user device 106, and/or the selected secure web container 108 and instead only sharing the location and/or the identity of the selected egress node 110, the location and/or the identity of the user 102 may be effectively protected during the secure web browsing session.

As illustrated in FIG. 1A, the web content may be accessed from one or more web servers 112, which are configured to receive web content requests from the one or more egress nodes 110. However, even though the user 102 may initiate a web content request via the secure analysis application on the user device 206 and using the one or more secure web containers 108, only the location and/or the identity of the one or more egress nodes 110 (and not the locations and/or identities of the secure analysis application 104, the user device 106, and/or the one or more secure web containers 108) may be identified by the one or more web servers 112 upon receipt of the web content request.

Because the location and/or the identity of the one or more secure web containers 108 (as well as the secure analysis application 204 and the user device 206) may not be provided to and/or identified by the one or more content servers 112, the one or more content servers 112 may be unaware of the web content's final destination location and/or identity. Further, the one or more content servers 112 may be unaware of any processing and/or requests (e.g., application programming interface (API) requests) to be performed to the web content.

For example, upon receipt of the web content from the one or more web servers 112, the one or more secure web containers 108 may process the web content to identify and/or extract text included in the web content. The one or more secure web containers 108 may then transmit the extracted text to a translation service 114 for translation. In some embodiments, the translation service 114 may be performed and/or operated by a third party device.

Because the one or more secure web containers 108 extracted and transmitted text from the web content to the translation service 114 (as opposed to simply transmitting the web content and/or a universal resource locator (URL) of the web content to the translation service 114), the translation service 114 may be unaware of the web content's origin location and/or identity. In this way, embodiments described herein provide a "double-blind" manner of providing an anonymous translation service of the web content (e.g., a web page that includes text) in the sense that both the provider of the web content (e.g., the one or more web servers 112) and the translator of the web content (e.g., the translation service 114) are unaware of each other, as well as any actions previously and/or to be performed to the web content.

After translation of the text is completed by the translation service 114, the one or more secure web containers 108 may receive translated text (e.g., a transformed version of the text extracted from the web content) from the translation service 114. The one or more secure web containers 108 may generate transformed web content (e.g., a web page that displays text in a language different than the language of the text extracted from the web content) using the translated text. In this manner, the user 102 may utilize various elements described herein to perform anonymous text translations of text included in web content (e.g., web pages) and to generate transformed web content based on the text translations.

The one or more secure web containers 108 may transmit the web content, extracted text, translated text, transformed web content, location and/or identity information associated with the user 102, the secure analysis application 104, the user device 106, the one or more secure web containers 108, the one or more egress nodes 110, the one or more web servers 112, and/or the translation service 114, user preferences, settings, and/or any other data to a cloud-based storage platform 116 for storage. The user 102 may access any data stored in the cloud-based storage platform 116 using the secure analysis application 104 and/or the one or more secure web containers 108.

System Description

As described above, the user 102 may initiate the secure analysis application 104 from the user device 106 (e.g., a local machine such as a laptop, a desktop, a computing device, a mobile device, and/or the like), which may communicate with a client interface to instantiate one or more secure web containers 108. The secure web containers 108, the client interface, and/or the secure analysis application 104 may be located on a single host machine (e.g., computing device) and/or may be distributed across a networked group of host machines.

Each secure web container 108 may have storage and/or processing capabilities as described herein to access web content, websites, web-based applications, and other resources hosted on web servers 112, respectively, on behalf of the user 102 of the user device 106. The secure web containers 108 may transcode data received from the web servers 112 to be securely presented to the user 102 at the user device 106 via the secure analysis application 104. This allows code from a web server 112 to be executed in a "sandbox" environment provided by a secure web container 108 instead of the user device 106, while still allowing the user to view and interact with content from the web server 112. Each secure web container 108 may be independently configurable and may be isolated from other secure web containers 108, including those residing upon a common host machine. By providing a highly isolated environment, each secure web container 108 minimizes the risks associated with accessing potentially dangerous web content for both the user device 106 and the secure analysis application infrastructure (e.g., including the plurality of secure web containers 108 and/or the secure analysis application 104). For example, each secure web container 108 may be isolated from the other secure web containers 108, in part, by having separate and transient session data that may be purged at the end of each session.

Furthermore, the user 102 of the user device 106 may simultaneously launch and operate multiple isolated sandbox environments (e.g., secure web containers 108) within the same user session (e.g., a period of time when the user is using the secure analysis application 104), each running a particular configuration of a remote browser provided by the secure web containers 108. Accordingly, the user 102 may access the same or different web servers 112 via egress nodes 110 with differently configured remote browsers simultaneously and independently. This allows the user 102 to have increased flexibility in crafting their digital identity when accessing web servers 112.

Browser Location

For jurisdictional or other reasons, it may be beneficial to control the physical location (e.g., IP address, physical processing device and/or storage device) of each secure web container 108 that acts as a remote browser to render or execute web content from a web resource (e.g., a web server 112). Multiple servers or other hardware for providing secure web containers 108 may be physically distributed across a region or even globally to provide this level of control.

Because multiple locations in the network (e.g., across an organization) may be available for utilization and/or routing by the secure analysis application 104, the secure web containers 108, and/or the egress nodes 110, a system administrator and/or the user 102 may select a particular browser location in the network for each of the secure analysis application 104 and/or the secure web container 108, as well as the one or more egress nodes 110, through which web content and/or information may be transmitted and/or routed. Additionally or alternatively, individual users 102 may, in some embodiments, select a specific network location for the secure analysis application 104, the secure web containers 108, and/or the egress nodes 110 when beginning a new session and/or instantiating a secure web container 108.

The secure web container's location may not necessarily be available to the web servers 130 that are accessed. Instead, an egress node, as described below, may be used to prevent the web servers 130 from determining the location of the secure web container 120 (e.g., browser location) or the location of the user's user device 106.

Egress Node

As described above, the secure analysis application 104 and/or the secure web containers 108 may utilize a plurality of selectable egress nodes 110 through which the web content may be routed. An egress node 110 is a node by which an IP packet (e.g., having an HTTP GET method) enters into a public network (e.g., the Internet).

There are many scenarios where the user 102 may not want personally identifying information (e.g., their IP address and location, identity information, and/or the like) to be known by a web server 112 when requesting web content and may thus benefit from masking and/or modifying his/her digital persona. Furthermore, there may be advantages to selecting a particular egress node 110 location independently from the location of the user device 106 and/or the secure web containers 108. For example, web servers 112 may be able to alter the presentation of the web content or even the web content itself based on the perceived egress node 112 from which a request arrives. This may allow a malicious website, for example, to selectively expose the user 102 to malignant code based on their perceived egress node 112 and apparent location. When evaluating the potential threats of a website, the user 102 may thus benefit from being able to change their egress node 112, thereby changing their apparent location. It may be noted that this is but one of many scenarios where customisable attribution may be beneficial. Information security applications may be improved by this functionality, in that customizable attribution may benefit internal reliability or security testing of a company's own web resources.

As shown in FIG. 1A, the secure analysis application 104 may utilize various secure web containers 108 (e.g., remote web browsers) and/or various egress nodes 110, all of which may be provided by a networking infrastructure distributed across multiple regions or even globally (e.g., on separate devices). In some embodiments, a system administrator may allow the user 102 (e.g., an information security researcher) of the user device 106 to select a location for one or more of the secure web containers 108 and/or the egress nodes 110 when the user 102 begins a new session of the secure analysis application 104. The user's choice may be regionally limited by a specified range (e.g., within the continental United States). In some embodiments, the system administrator may provision a particular secure web container 108 and/or egress node 110 for utilization by the user 102 during a secure web browsing session. If neither the user 102 nor the system administrator specify a location for the secure web containers 108 and/or the egress nodes 110, a default secure web container 108 and/or egress node 110 may be automatically provided for routing web content from one or more web servers 112 during a secure web browsing session.

In some embodiments, an egress node 110 may be randomly selected for a session to avoid repeated access that might provoke suspicion from a targeted web server's administrator. The pool of egress nodes 210 from which a randomly selected egress node 210 may be chosen may share common traits such as region.

While the secure web containers 108, which may receive web content and execute web code from the web server 112 via one or more egress nodes 110, may prevent the web server 112 from determining the location of the user's user device 106, the selected egress node 110 may prevent the web server 112 from determining the location of even the secure web container 108. By allowing an egress node 110 to be located in the network separately and independently from the host machine hosting the secure web container 108 and/or the user device 106, the disclosed principles provide increased flexibility in establishing both remote browser locations (e.g., for jurisdictional reasons) and apparent locations (e.g., for probing the web server 112 with customizable attribution information).

In some embodiments, an organization having users of the secure analysis application may receive an expandable package (e.g., from the secure analysis application provider) that enables a system administrator or user of the organization to create and provide their own egress node 110 whenever and wherever they choose (e.g., on an user-provided machine and/or user device 106). This manually-generated egress node 110 may securely bind with the secure analysis application and may be disabled after one or more uses.

Browser Fingerprint

When the user accesses a website (e.g., web content) through a device (e.g., the user device 106), the web server 112 underlying the website may receive a browser fingerprint that defines various aspects of the device 106. For example, the browser fingerprint may describe the type of web browser, operating system, language support, plug-ins (including version designation), resolution, location, time zone, rendering capabilities of the user device 106, and/or an identity of the user 102. This information may be useful for a website (e.g., the web server 112) to provide a compatible presentation of web content.

However, utilizing a secure web container 108 and/or an egress node 110 during a browsing session may prevent the browser fingerprint of the user device 106 from being presented to the web server 112. Instead, locations and/or identities associated with the secure web container 108 and/or the egress node 110 may be provided to the web server 112 (even though the user 102 is accessing the web content via the secure analysis application 104 running on the user device 106) to thereby provide a complete, consistent, and/or credible anonymous identity for the user 102.

The secure analysis application 104 and/or the secure web containers 108 may comprise and/or communicate with a database (e.g., cloud-based storage platform 116) for storing default browser fingerprints that are organized by apparent location (e.g., as established by a secure web container 108 and/or an egress node 110). The database may be created by determining browser fingerprints that are most characteristic of a typical user device accessing the web content so that the user 102 is unlikely to stand out (e.g., is not suspicious) to the web server 112 during the browsing session.

The secure analysis application 104 may allow other elements of the browser fingerprint (e.g., an operating system, a type and/or location of web browser provided by the secure web containers 108, a type and/or location of an egress node 110, and/or the like) to be altered by a system administrator and/or the user 102. Certain high-level information (e.g., operating system information, browser information, software vendor information, user information, and/or the like) are generally contained within a user agent string that is placed in the header of outgoing messages. These elements are often more easily alterable. A system administrator and/or the user 102 may set policies within a policy database associated with the secure analysis application 104 (e.g., cloud-based storage platform 116), where the policies may allow the user 102 to change certain elements of the user agent information before or even after starting a session of the application. The policies may further dictate whether the user 102 is required to input authentication credentials when initiating a secure browsing session and/or accessing data associated with a secure browsing session. Additionally, the policies may dictate whether free form navigation is allowed or disallowed to the user 102 based on a user type, a level of authentication provided by the user, and/or the like. Additionally, settings associated with the secure browsing session such as a configuration of the secure analysis application 104, secure web containers, the cloud-based storage platform 116, and/or the like may be defined by one or more policies. The policies may be based on a variety of data including data collected, received, accessed, and/or determined by the secure analysis application 104 and/or the cloud-based storage system 116.

In some embodiments, the browser fingerprint may be randomly assigned for a session. This randomly assigned browser fingerprint may be selected from a pool of browser fingerprints which may each potentially correspond with the selected secure web containers 108 and/or selected egress nodes 110 associated with the session (e.g., as selected by the user 102, by the system administrator, or randomly).

Translation

As described above, the translation service 114 may be integrated with the secure analysis application 104 by communicating with the secure web containers 108. In many scenarios, a web server 112 may provide textual web content that is in a different language than desired by the user 102 at the user device 106. The secure analysis application 104 may help enable the translation of web content from the web server 112 without alerting and/or directly contacting the web server 130 with an external web translation request.

When the user 102 chooses to view a web page having foreign language text, the user 102 may send a request specifying the requested web content to the web server 112 via the secure analysis application 104 and/or the secure web container 108. For example, the request could be an HTTP GET message requesting content and may be routed from the secure web container 108 to the web server 112 by way of a particular egress node 110. The secure web container 108 may enable the user 102 to specify a preferred language for content to be translated into and received by the user 102. In some embodiments, the preferred language may be established during the initiation of the session associated with the secure web container 108.

The secure web container 108 may send a modified request to the web server 112, where identifying information (e.g., user agent information) of the user device 106 is removed and/or replaced with information associated with the secure web container 108 and/or the egress node 110 through which the request is routed and/or the web content is routed. This request may also be sent through a selectable or randomized egress node 110 (not shown), as described above.

The secure web container 108 may receive the requested content from the web server 112 through the egress node 110. The secure web container 108 may analyze the received content to identify textual content. If the secure analysis application 104 detects that the language of the identified textual content is different from a preferred language as specified by the user 102, the identified textual content and preferred language may be sent in a translation request to the translation service 114. It would also be possible for the secure analysis application 104 to send all textual content associated with a particular web page through the translation service 114 based on pre-configured information.

In some embodiments, the translation service 114 may provide an application programming interface (API) for sending and receiving information, and the translation request may be an API call. The secure web container 108 may receive translated textual content from the translation service 114. The secure web container 108 may then render a full presentation of requested content using the translated textual content (e.g., replacing the initially detected textual content with the translated textual content received from the translation service 114). In this manner, the user 102 may then view the requested content in the preferred language.

Alternatively, the user 102 of the user device 106 may first view the secure web container's 108 rendering of the web content in its native language (e.g., untranslated textual content). The user 102 may then request the secure web container 108 to provide translations for some or all of the textual content. The secure web container 108 may then communicate with the translation service 114 as described above to obtain the translated textual content and may then re-render a presentation for the viewing via the secure analysis application 104 running on the user device 106, having at least some of the textual content in the preferred language.

As the translation service 114 does not communicate directly with the web server 112, the web server 112 may be unaware that any translation is being performed. Instead, the web server 112 may merely detect a content request from the secure web container 108 (or a corresponding egress node 110) that resembles other requests typically received by the web server 112. Similarly, the translation service 114 may be unaware that the textual content was extracted from a particular web page.

Cloud-Based Storage

As described above, the secure analysis application 104 and/or the secure web container 108 may be integrated with a temporal or persistent cloud-based storage platform 116 capable of storing both transient and persistent data. In some scenarios, the user 102 may want to store web content and/or textual content downloaded from a web server 112 for analysis or other purposes. However, locally storing these files on the user device 106 may be non-ideal for various reasons including the sensitivity of the information contained in the files or the potential for the content to be malicious in nature.

To avoid resorting to storage on the user device 106 while still maintaining their transient and secure properties, secure web containers 108 may be securely integrated with the cloud-based storage platform 116 as described herein. For example, web content received by the secure web container 108 from the web server 112 may be sent to the storage platform 116 to be stored even after a session involving the secure web container 108 is completed.

The cloud-based storage platform 116 may then store the content, either permanently or temporarily, and may ensure that the content can only be accessed from authorized secure web containers 108 and not from other clients such as a local browser. Accordingly, the cloud-based storage platform 116 may be one mechanism by which data may securely persist after the secure web container 108 is collapsed and/or deactivated. The content may be accessed by the same user 102 or by a different user through a second secure web container 108 and a second user device (not pictured) at a later time.

The cloud-based storage platform 116 may be implemented with multiple layers to enhance security. In some embodiments, the cloud-based storage platform 116 may have encrypted data stores having nondescript naming conventions and flat or otherwise obfuscated directory structures. Additionally, the placement of new files within these data stores may be random or otherwise obscured. The files on the data stores may be encrypted through a variety of techniques. In some embodiments, the data stores may be encrypted using symmetric keys that are centrally managed by the provider of the secure analysis application 104. In other embodiments, the data stores may be asymmetrically encrypted using public keys provided by an end user, such that only the end user (and not even the secure analysis application provider) may privately access the files within the data store. As the contents of the data store may be encrypted, the files and directory stored by the data store may not be directly browsable (e.g., without a mapping table and/or an encryption key). Therefore, unauthorized systems such as a local browser, may be restricted from viewing the contents, and even the file directory or any other logical representation, associated with the data store. Accordingly, the data store itself may be conveniently stored in a third-party storage layer (e.g., Amazon's Simple Storage Service (S3)), within near or within a user's physical premises, or other storage locations. The cloud-based storage platform 116 may further comprise a mapping table linked to the encrypted data stores. In some embodiments, the mapping table may provide a meaningful data structure and set of file names for the data located in the encrypted data stores. The mapping table may, in some embodiments, be stored and provided by the secure analysis application provider.

In some embodiments, the above-described security features (e.g., encryption, random file placement, obfuscated directory structures) may all be implemented, and in other embodiments, a subset of the security features may be implemented in combination. Numerous other security features may additionally or alternatively be implemented.

The data stores of the cloud-based storage platform 116 may be divided into separate classes. For example, some data stores may be persistent whereas other data stores may be ephemeral or transient. This may provide greatly increase flexibility in establishing and enforcing data retention rules. For example, in some embodiments, a system administrator may want to restrict content that is associated with a particular secure web container, user, or web server from being stored for more than a certain amount of time. As such, content falling into this scope may be automatically placed within a transient data store of the cloud-based storage platform 116 where it may be deleted after a set amount of time or at a particular date and time. In some scenarios, a transient data store may expire at the end of a session or after a set number of web browsing sessions.

The cloud-based storage platform 116 may restrict access to the data that it contains. For example, the cloud-based storage platform 116 may be provisioned at an organization level, with portions dedicated to individual users and other portions acting as shared drives between multiple users or even an entire organization. A system administrator and/or the user 102 may select the geographic region or regions for the physical locations of the data store(s) used for their organization (e.g., for jurisdictional and/or user policy reasons).

The secure web containers 108 may provide users with file browsers for accessing the encrypted data store(s) within the cloud-based storage platform 116. The file browsers may also be used to upload files to a third-party service (not pictured) such as a file analysis service. The cloud-based storage platform 116 may further provide a secure external application programming interface (API) that allows individuals and organizations to pull data from or push data to the encrypted data stores without using the secure web containers 108.

The cloud-based storage platform 116 may be configurable by the user 102 or system administrators to accommodate many different scenarios. For example, a set of stored files may be restricted to a single user who may re-instantiate her/his secure web container 108-1 to access the content. The user 102 may also choose to share folders or particular files initially allocated to her/him with other users within an organization. When sharing data, the user 102 may specify a time period for which the data may be shared with another user, or the user 102 may share the data indefinitely. In addition, the user 102 may restrict certain file rights. These file rights may include downloading a shared file from the data store (e.g., to their secure web container 108), executing a shared file, editing a shared file, uploading to a shared folder, and printing a shared file, among other file rights. The user 102 or system administrators within an organization may also configure data retention rules, such that data is removed from the cloud-based storage platform 116 after an established period of time or a deletion-triggering event, as discussed above.

In some embodiments, the cloud-based storage platform 116 may be configured by policy to interact with the file system of the secure analysis application 104 and/or the user device 106. For example, a policy may require authentication credentials and/or authentication of the user 102 before utilizing and/or accessing data stored within the cloud-based storage platform 116, the secure system application 104, and/or the user device 106. If the system administrator enables this interaction, then the user 102 may have the ability to transfer content between her/his user device 106 and the cloud-based storage platform 116 (e.g., both upload and download). Conversely, a policy may restrict interaction between the user device 106 and the cloud-based storage platform 116, so that users may be able to download content to the cloud-based storage platform 116 when visiting web servers 112 via the secure analysis application 104 and/or the secure web container 108 but may not be permitted to transfer files between the file system of the user device 106 and/or the secure web container 108 and the cloud-based storage platform 116 in either direction.

Encrypted Logging

Session data that is accumulated during the use of a secure web container 108 may generally be purged from the secure web container after the session is complete. However, in some embodiments, log entries corresponding to the sessions may be stored and compiled in a log database (e.g., cloud-based storage platform 116) before or upon session completion. For example, the log database may store log entries corresponding to each session for internal analysis or record keeping (e.g., within an organization associated with the secure analysis application 104).

In some embodiments, the log databases may retain log entries for a set time period and/or on a rolling basis (e.g., 90 days) before log entries are automatically deleted. The log entries may include various types of data including user data and session data (e.g., host machine identifiers, access times, and/or session durations). The log entries may also have a parameter indicating the organization to which they belong. This organization-level separation allows a system administrator (e.g., the user 102) within an organization to establish the particular types of data that are logged as well as the period for which different types of logged data are stored for their organization.

Furthermore, the system administrator may provide a public key to the log database for encrypting their organization's logs. The system administrator may subsequently request and receive their encrypted logs through an external application programming interface (API) of the now-encrypted log database. The encrypted logs may then be decrypted within the system administrator's local network or on their local machine through a private key that matches the public key provided to the log database for encryption. Other encryption systems may be implemented to ensure that access to the encrypted logs is restricted to those having the correct credentials (e.g., system administrators within an organization to which the logs relate).

In some embodiments, the system administrator may increase the granularity of the data captured and stored within their encrypted log database. For example, logging functionality may be increased to include user navigation data (e.g., the web resources accessed, with time stamps), administrative changes to the secure analysis application's configuration, authentication events, session events, and web form post data (e.g., data provided to web resources).

URL Forwarding

With further reference to FIG. 1A, the user 102 may wish to access web content associated with a particular URL (e.g., a hyperlink, a web address, a web page, and/or the like). For example, the user 102 may input a URL and/or web address into a browser window (e.g., a local or unsecure browser window on the user device 106). However, in some instances, web content associated with a desired URL may unknowingly be malicious, may include harmful artifacts, and/or may otherwise present security risks to the user device 106 if accessed using an unsecure browser. Embodiments described herein with reference to URL forwarding techniques may enable the user 102 to access web content associated with a desired URL in a secure manner using one or more secure web containers 108 regardless of which client web browser the user 102 used to input the desired URL.

For example, the user 102 may utilize a typical unsecure web browser local to the user device 106 to surf the web or otherwise access web content associated with various URLs (e.g., web content comprised in various web servers 112). When the user 102 inputs and/or selects a URL (e.g., through a web address, a web page, or other web content) in a browser window of the web browser local to the user device 106, a web gateway including one or more gateway policies, the secure analysis application 104, the user device 106, or another device (e.g., an enterprise device such as a network server, or a firewall local to or in communication with an enterprise network on which the user device 106 operates, a plug-in of the web browser running on the user device 106, a client interface, or a client agent running on the user device 106 and associated with the secure analysis application 104) may determine, based on the URL, that web content associated with the URL may not be secure (e.g., may present security risks to the user device 106 and/or another device).

Importantly, it may be unknown whether web content associated with an inputted or selected URL is malicious. As such, a network administrator may not wish for the web content to be accessed or executed locally (e.g., local to the user device 106 or network). The network administrator may thus forward the URL associated with web content of an unknown profile and/or potentially malicious characteristics to the secure analysis application 104 for remote execution of the web content. In this manner, the user 102 may be provided with "siloed" access to the web content associated with the URL without exposing the user device 106 or network to unknown and/or potentially harmful web content.

In some embodiments, the determination of whether web content associated with a desired URL is unknown or potentially harmful to the user device 106 or network may be made by a human network administrator. For example, the network administrator may review a list of web content requests. If the network administrator is unfamiliar with the source of the web content and thus does not want to risk exposing the user device 106 and/or network to potential security risks, the network administrator may forward the associated URL to the secure analysis application for creation of a secure web browsing session. The network administrator may determine whether the web content should be executed locally based on an unknown status, a potentially harmful status, and/or a web content category (e.g., social media, pornography, hate speech, and/or the like).

In other embodiments, the determination of whether web content associated with a desired URL is unknown or potentially harmful to the user device 106 or network may be automated. For example, the user device 106 may receive a URL or identify a URL comprised in user input received at the user device 106 (e.g., a click or other selection of a hyperlink, a selection of an image, a video or audio content). The secure analysis application 104, which may include various gateway policies for routing web traffic or providing access to web content, is operable to identify whether web content selected by or directed to the user 102 is potentially unsafe. If a match between the received/identified URL and a URL in the database of URLs known or suspected to be associated with harmful web content is determined, the received/identified URL may be determined to be associated with potentially harmful web content. If no match between the received/identified URL and a URL in the database of URLs known or suspected to be associated with harmful web content is determined, the user device 106 may proceed with accessing and/or retrieving web content associated with the received/identified URL, potentially even with the unsecure web browser.

Alternatively, if a match between the received/identified URL and a URL in the database of URLs known to be associated with safe web content is determined, the user device 106 may be enabled to proceed with accessing and/or retrieving web content associated with the received/identified URL using the unsecure browser and/or any other approved web browsing mechanism. If no match between the received/identified URL and a URL in the database of URLs known to be associated with safe web content is determined, the received/identified URL may be determined to be associated with potentially harmful and/or otherwise unknown web content. In some embodiments, a URL determined to be associated with potentially harmful and/or otherwise unknown web content may be stored in a database of URLs known to be associated with harmful web content.

In addition to blacklists of URLs known or supposed to be associated with potentially harmful web content and whitelists of URLs known or supposed to be associated with safe content, the secure analysis application 104 may also use adaptive means of determining danger levels associated with URLs. For example, the secure analysis application 104 may perform visual and/or auditory analysis of web content prior to providing the user device 106 with access to the web content to determine whether the web content includes any objectionable content.

Additionally, the secure analysis application 104 or web gateway may further determine a risk level associated with the received/identified URL. Determination of the risk level may include analysis of a variety of factors such as web content, URL type, attributes of a destination web page associated with the URL, a time of a request for the web content associated with the URL, a location of the user device 106, and a location of the web server 112 from which the web content is to be requested. Once determined, the risk level may be compared to a threshold value associated with an acceptable risk level. If the determined risk level meets or exceeds the threshold value, the received/identified URL may be determined to be associated with potentially harmful and/or otherwise unknown web content.

Once the received/identified URL is determined to be associated with potentially harmful or otherwise unknown web content, the secure analysis application 104 (e.g., web gateway) may establish an encrypted communication connection between the user device 106 and one or more secure web containers 108. In some embodiments, parameters of the established encrypted communication connection may be based at least in part on the received/identified URL and/or web content associated with the received/identified URL.

For example, the secure analysis application 104 or web gateway may identify, select, and/or initialize the one or more secure web containers 108 for creating a secure environment in which the user 102 may access the potentially harmful and/or otherwise unknown web content associated with the received/identified URL. For example, a particular amount of memory and/or processing power of each of the one or more secure web containers 108 may be partitioned for accessing the potentially harmful and/or otherwise unknown web content associated with the received/identified URL. Techniques and systems for providing secure web containers 108 as described herein are described in greater detail in U.S. patent application Ser. No. 13/076,421, filed Mar. 30, 2011 and entitled "Disposable Browsers and Authentication Techniques for a Secure Online Environment," and U.S. patent application Ser. No. 13/844,026, filed Mar. 15, 2013 and entitled "Secure Web Containers for a Secure Online Environment," both of which are incorporated by reference in their entireties. Additionally, the secure analysis application 104 may select locations (e.g., IP addresses, devices on which to operate, and/or the like) of the one or more secure web containers 108 and/or egress nodes 110 to be used when accessing the potentially harmful and/or otherwise unknown web content associated with the received/identified URL from one or more web servers 112.

The received/identified URL is then transmitted from the user device 106 (e.g., forwarded) to the one or more secure web containers 108 via the encrypted communication connection. Once received by the one or more secure web containers 108, the received/identified URL may be used by the secure analysis application 104 and/or the one or more secure web containers 108 to identify one or more web servers 112 associated with the desired web content associated with the received/identified URL. The secure analysis application 104 and/or the one or more secure web containers 108 may also use the received identified URL to initialize and/or select one or more egress nodes 110 to be used during retrieval and/or access of the web content.

The one or more secure web containers 108 may then retrieve the web content associated with the received/identified URL from the one or more identified web servers 112 through any selected and/or initialized egress nodes 110. In some embodiments, the one or more secure web containers 108 may store the retrieved web content. In other embodiments, the one or more secure web containers 108 may not store the retrieved web content.

Once retrieved and/or otherwise accessed by the one or more secure web containers 108, the desired web content associated with the retrieved/identified URL is then rendered at the one or more secure web containers 108. By rendering the web content at the one or more secure web containers 108 (e.g., in a secure environment and at an "arm's length" from the user device 106), the user device 106 is protected from unwanted exposure of potentially harmful web content. Further, by utilizing the one or more secure web containers 108 and the selected egress nodes 110 to retrieve and/or access the web content from the web servers 112, the user device 106 (and thus the identity of the user 102) may be hidden from the web servers 112. Similarly, the identity of the web servers 112 may be hidden from the user device 106 and/or the user 102 during retrieval and/or accessing of the web content.

The user 102, using the user device 106, may remotely access the web content being rendered on the one or more secure web containers 108 by way of a client agent and/or interface running on the user device 106 and associated with the secure analysis application 104 and/or other system elements as described herein. For example, the client interface running on the user device 106 may enable the user 102 to view the web content rendered on the secure web container(s) 108 via the encrypted communication connection established between the user device 106 and the one or more secure web containers 108. Again, techniques and systems for rendering web content at secure web containers 108 as described herein are described in greater detail in U.S. patent application Ser. No. 13/076,421, filed Mar. 30, 2011 and entitled "Disposable Browsers and Authentication Techniques for a Secure Online Environment," and U.S. patent application Ser. No. 13/844,026, filed Mar. 15, 2013 and entitled "Secure Web Containers for a Secure Online Environment," both of which are incorporated by reference in their entireties. The user 102 may also utilize a web browser local to the user device 106 to access the web content via the secure web containers 108 as described herein.

In some embodiments, the secure analysis application 104 may generate and/or otherwise present to the user 102 on the user device 106 a new secure web browser window (e.g., the user interface 300 of FIG. 3, a client agent and/or interface running on the user device 106 and associated with the secure analysis application 104, and/or the like) through which the user 102 may access and/or view the content rendered on the one or more secure web containers 108. In this manner, regardless of which web browser the user 102 used initially to request web content, the user 102 is provided with secure access to the requested web content at an "arm's length" through a secure web browsing session as described herein. In some embodiments, the user 102 may request the potentially harmful web content in a first browser window (e.g., an unsecure browser), and then be enabled to view the requested web content in a second browser window (e.g., a secure browser and/or a client agent and/or interface running on the user device 106 and associated with the secure analysis application 104). The web content may also be accessible to the user 102 via the same web browser local to the user device 106 that the user 102 utilized to input the URL.

In some embodiments, the user 102 may be provided with a notification that requested web content and/or web content associated with a provided URL is potentially harmful to the user device 106. For example, the secure analysis application 104 may generate, upon determining that requested web content may be potentially harmful to the user device 106, the notification and present the notification to the user 102 on the user device 106 via a client agent and/or interface running on the user device 106 and associated with the secure analysis application 104. The notification may be presented to the user 102 at various times during the described URL forwarding processes. In some embodiments, the notification may include a generated risk level score and/or other identifying information associated with the determination that requested web content may be potentially harmful to the user device 106.

Once the user 102 has accessed and/or viewed the requested web content, the secure analysis application 104 may terminate the encrypted communication connection between the user device 106 and the one or more secure web containers 108, the communication connection between the one or more secure web containers 108, the egress nodes 110, and/or the web servers 112, and/or the like. In embodiments described, when accessing web content through secure web containers 108, no web code is transmitted to the user device 106, and instead the web content may be transmitted to and/or rendered on the one or more secure web containers 108. The user device 106 may simply be provided access to the one or more secure web containers 108 (e.g., images and/or audio of the web content may be presented on the user device 106, but the actual web code or content remains at the one or more secure web containers 108), which may enable the user 102 to view the requested web content at an "arm's length."

In some embodiments, authentication of the user 102 may not be required by the secure analysis application 104 to create a secure web browsing session or for the user 102 to access the web content. For example, a user-specific digital authentication certificate associated with the user 102 (e.g., a password, a login credential, or a key) may be stored in the cloud-based storage system 116 for quick recall by the secure analysis application 104 during the web browsing session. In some embodiments, the authentication certificate may be stored in a profile storage unit 232 and accessed by a profile management unit 210 as described below with reference to FIG. 2. Alternatively, the authentication certificate may be stored on a common access card (CAC) or in another location not local to the secure web containers 108. In some embodiments, the secure analysis application 104 may be configured to automatically retrieve the authentication certificate from the user device 106 or another location, such as from a CAC via an encrypted communication connection. The secure analysis application 104 may retrieve the authentication certificate when initializing the secure web browsing session or various times (e.g., intervals or as needed) during the secure web browsing session.

The secure analysis application 104 may then be configured to automatically provide the authentication certificate to the web servers 112 or other devices as required during the web browsing session. In this manner, the user 102 may be enabled to access web content during the secure web browsing session without having to continually input user authentication credentials.

Figure 1B:
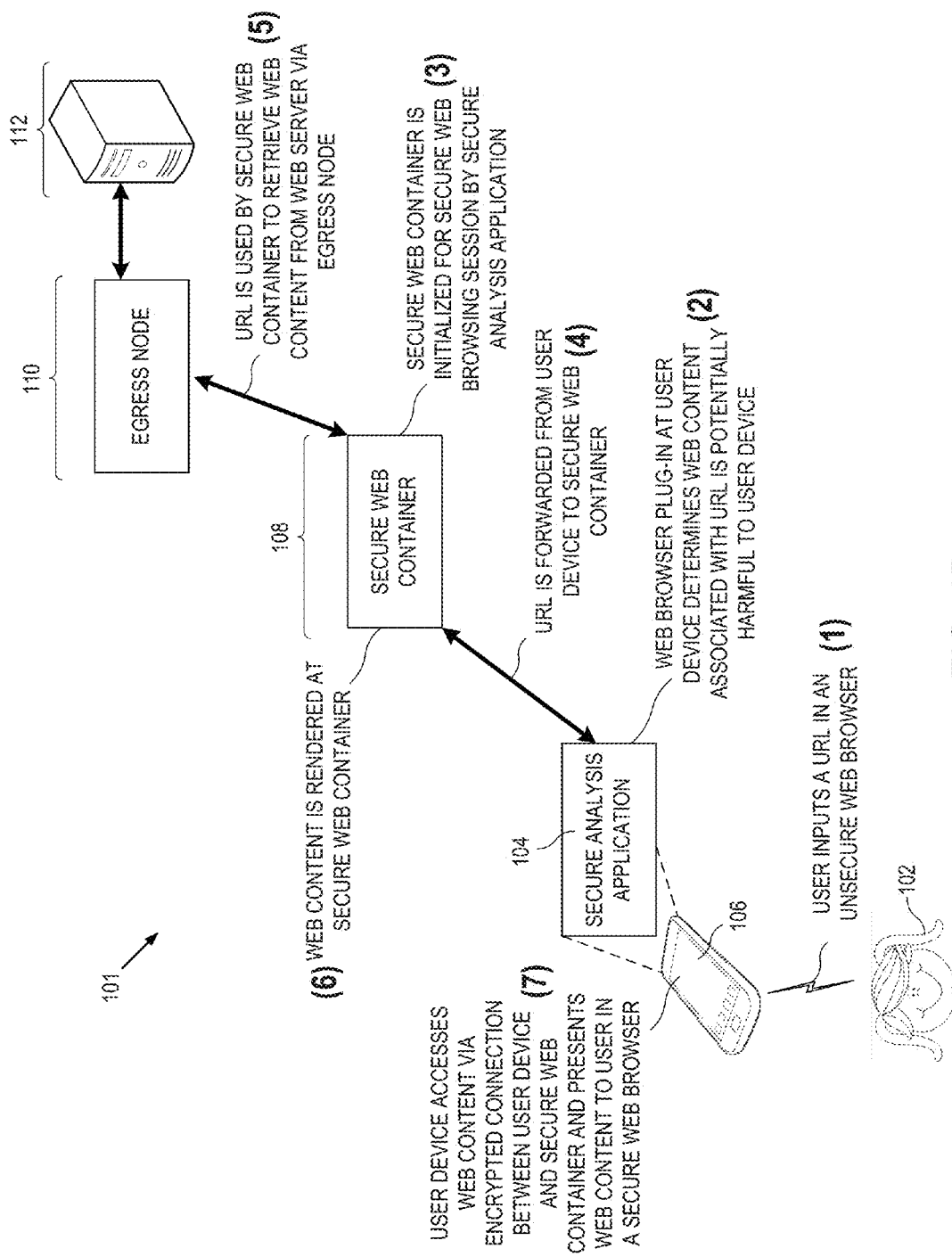
FIG. 1B shows an exemplary system for providing URL forwarding techniques, in accordance with some embodiments of the disclosure.

FIG. 1B illustrates an exemplary system 101 performing URL forwarding operations as described herein. Similar in structure to system 100 of FIG. 1A, system 101 of FIG. 1B provides a user 102 of a user device 106 with secure access to potentially harmful web content rendered on a secure web container 108.

For example, at (1), the user 102 may input a web address (e.g., a URL) in an unsecure web browser local the user device 106 (e.g., may type a web address in an address bar of a browser window, may select an image, audio, text, and/or a video, may select a hyperlink, may open an email attachment and/or other file, and/or the like). The user 102 may also input the web address using a client agent and/or interface (e.g., a secure browser) running on the user device 106 that is associated with the secure analysis application 104.

At (2), a browser plug-in running on the user device 106 (e.g., the client agent or interface associated with the secure analysis application 104 and/or a web gateway that includes various gateway policies) may determine, using techniques described herein, that web content associated with the web address is potentially harmful to the user device 106 and/or another device on a shared network. In some embodiments (not shown), the web address may be forwarded from the user device 106 to a secure analysis application 104 running on the cloud, and the secure analysis application 104 and/or web gateway policies may perform the determination of whether the web content associated with the web address is potentially harmful.

At (3), and after the web content is determined to be potentially harmful, the secure analysis application 104 may initialize a secure web container 108 for hosting a secure web browsing session during which the web content may be accessed. The secure analysis application 104 may also initialize an egress node 110 through which the secure web container 108 may retrieve the web content from the web server 112. The secure analysis application 104 may further establish a secure encrypted communication connection between the user device 106 and the secure web container 108. The secure analysis application 104 may also establish a communication connection between the secure web container 108 and the web server 112 comprising the web content associated with the web address, wherein the communication connection between the secure web container 108 and the web server 112 includes the egress node 110.

At (4), the web address is forwarded from the user device 106 to the secure web container 108 via the encrypted communication connection. In some embodiments, the secure analysis application 104 may be used to forward the web address to the secure web container 108 based on one or more web gateway policies.

At (5), the secure web container 108 uses the web address to retrieve the web content associated with the web address. The web content may be retrieved by the secure web container 108 and from the web server 112 via the established communication connection between the secure web container and the web server 112. In some embodiments, the web content passes through the egress node 110 during retrieval. In some embodiments, the secure analysis application 104 may itself retrieve the web content.

At (6), the secure web container 108 renders the web content. Importantly, rendering the web content at the secure web container 108 ensures that the web content is not transmitted to the user device 106, thereby protecting the user device 106 from potential harm. In some embodiments, the secure analysis application 104 may render the web content at the secure web container 108.

At (7), the user 102 may use the user device 106 to access the web content rendered at the secure web container 108 via the encrypted communication connection. For example, the user 102 may utilize the client agent and/or interface (e.g., a secure browser) running on the user device 106 that is associated with the secure analysis application 104 to access the web content. The user 102 may also utilize the unsecure web browser local to the user device 106 to access the web content in a new window populated with a hyperlink associated with the web content rendered on the secure web container 108. In this manner, the web content is not transmitted to the user device 106. In some embodiments, a notification may be presented to the user 102 indicating that a new secure browsing session has been initiated to enable the user 102 to view potentially harmful web content.

A detailed process flow of the URL forwarding process is found below in FIG. 6 and its accompanying text.

Computing Architecture

Figure 2:
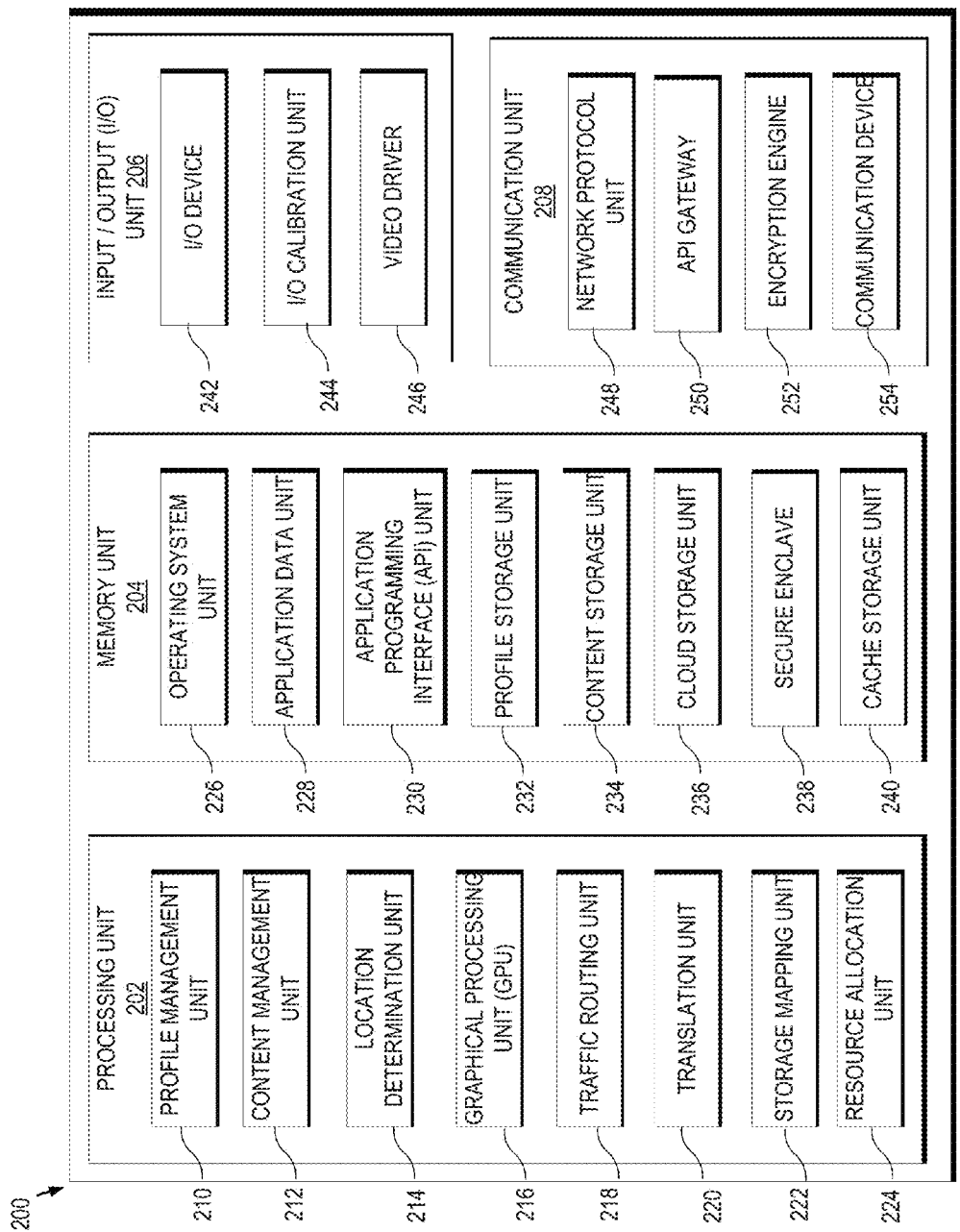
FIG. 2 shows an exemplary computing environment for providing a secure analysis application, in accordance with some embodiments of the disclosure.

Referring now to FIG. 2, FIG. 2 illustrates an exemplary computing environment 200 for providing secure web browsing sessions and anonymous translation services as described herein. For example, the computing environment 200 may be included in and/or utilized by the user device 106 the secure analysis application 104, the secure web containers 108, the egress nodes 110, the web servers 112, the translation service 114, and/or the cloud-based storage platform 116 of FIG. 1A-1B, and/or any other device described herein. Additionally, any units and/or subunits described herein with reference to FIG. 2 may be included in one or more elements of FIG. 1A-1B. The computing environment 200 and/or any of its units and/or subunits described herein may include general hardware, specifically-purposed hardware, and/or software.

The computing environment 200 may include, among other elements, a processing unit 202, a memory unit 204, an input/output (I/O) unit 206, and/or a communication unit 208. As described herein, each of the processing unit 202, the memory unit 204, the I/O unit 206, and/or the communication unit 208 may include and/or refer to a plurality of respective units, subunits, and/or elements. Furthermore, each of the processing unit 202, the memory unit 204, the I/O unit 206, and/or the communication unit 208 may be operatively and/or otherwise communicatively coupled with each other so as to facilitate the political content communication and audio-visual analysis techniques described herein.

The processing unit 202 may control any of the one or more units 204, 206, 208, as well as any included subunits, elements, components, devices, and/or functions performed by the units 204, 206, 208 included in the computing environment 200. The processing unit 202 may also control any unit and/or device included in the system 200 of FIG. 2. Any actions described herein as being performed by a processor may be taken by the processing unit 202 alone and/or by the processing unit 202 in conjunction with one or more additional processors, units, subunits, elements, components, devices, and/or the like. Additionally, while only one processing unit 202 may be shown in FIG. 2, multiple processing units may be present and/or otherwise included in the computing environment 200. Thus, while instructions may be described as being executed by the processing unit 202 (and/or various subunits of the processing unit 202), the instructions may be executed simultaneously, serially, and/or by one or multiple processing units 202 in parallel.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits and/or elements of the aforementioned units, other devices and/or computing environments, and/or the like. As described herein, any unit and/or subunit (e.g., element) of the computing environment 200 and/or any other computing environment may be utilized to perform any operation. Particularly, the computing environment 200 may not include a generic computing system, but instead may include a customized computing system designed to perform the various methods described herein.

In some embodiments, the processing unit 202 may include, among other elements, subunits such as a profile management unit 210, a content management unit 212, a location determination unit 214, a graphical processing unit (GPU) 216, a traffic routing unit 218, a translation unit 220, a storage mapping unit 222, and/or a resource allocation unit 224. Each of the aforementioned subunits of the processing unit 202 may be communicatively and/or otherwise operably coupled with each other.

The profile management unit 210 may facilitate generation, modification, analysis, transmission, and/or presentation of a user profile associated with a user. For example, the profile management unit 210 may prompt a user via a user device to register by inputting authentication credentials, personal information (e.g., an age, a gender, and/or the like), contact information (e.g., a phone number, a zip code, a mailing address, an email address, a name, and/or the like), and/or the like. The profile management unit 210 may receive, process, analyze, organize, and/or otherwise transform any data received from the user and/or another computing element so as to generate a user profile of a user that includes personal information, contact information, user preferences, a photo, a video recording, an audio recording, a textual description, a virtual currency balance, a history or log of user activity, user preferences, settings, and/or the like. In some embodiments, the profile management unit 210 may enable a user to input desired settings associated with a web browsing session.

The content management unit 212 may facilitate generation, modification, analysis, transmission, and/or presentation of web content. For example, the content management unit 212 may control the audio-visual environment and/or appearance of application data and/or web pages during execution of various processes. Web content for which the content management unit 212 may be responsible may include advertisements, images, text, themes, audio files, video files, documents, and/or the like. In some embodiments, the content management unit 212 may also interface with a third-party content server and/or memory location for identifying, receiving, transmitting, and/or distributing content to one or more users.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determination unit 214 may include various sensors, a radar, and/or other specifically-purposed hardware elements for enabling the location determination unit 214 to acquire, measure, and/or otherwise transform location information. The location determination unit 214 may identify and/or control a location of the user device, the secure analysis application, the secure web containers, the egress nodes, the web servers, the translation service, and/or the cloud-based storage system as described herein.

The GPU unit 216 may facilitate generation, modification, analysis, processing, transmission, and/or presentation of visual content (e.g., web content as described above). In some embodiments, the GPU unit 216 may be utilized to render visual content, such as a web page, for presentation on the user device. The GPU unit 216 may also include multiple GPUs and therefore may be configured to perform and/or execute multiple processes in parallel.

The traffic routing unit 218 may facilitate determination, monitoring, analysis, and control of how data (e.g., web content, and/or the like) is routed throughout the devices described herein and/or the network as a whole. Various devices, such as routers, switches, computing devices, and/or the like may be controlled by the traffic routing unit 218. In some embodiments, the traffic routing unit 218 may facilitate the transmission, receipt, modification, and/or processing of data throughout the network. In some embodiments, the traffic routing unit 218 may determine one or more locations in the network through which data is to be routed (e.g., a particular secure web container and/or an egress node).

The translation unit 220 may facilitate the translation, transformation, modification, and/or processing of textual content. In some embodiments, the translation unit 220 may enable the translation service 114 to translate text provided by the secure web container from a first language into a second language. The translation unit 220 may utilize a variety of text processing functionalities to enable the secure web container to identify and/or extract text included in web content.

The storage mapping unit 222 may facilitate the transmission, receipt, storage, saving, and/or archiving of data in the cloud-based storage platform as described herein. The storage mapping unit 222 may interface with the memory unit 204 and control various subunits of the memory unit 204. In some embodiments, the storage mapping unit 222 may control read/write functionality of various subunits of the memory unit 204 based on jurisdiction and/or policy (e.g., user privileges). For example, a policy may dictate whether user authentication is required, whether access and/or navigation to one or more storage locations in the memory unit 204 is restricted, and/or the like. The storage mapping unit 222 may also include a variety of data distribution functionalities so that incoming data, such as web content, textual content, and/or usage and/or activity data may be appropriately saved. In some embodiments, the storage mapping unit 222 may further include security measures for securing data stored in the memory unit 204 as described herein.

The resource allocation unit 224 may facilitate the determination, monitoring, analysis, and/or allocation of computing resources throughout the computing environment 200 and/or other computing environments. For example, the computing environment 200 may facilitate a high volume of (e.g., multiple) web content requests and/or transmissions between a large number of supported devices, secure analysis applications, secure web containers, egress nodes, web servers, cloud-based storage platforms, and/or translation services so that a user may be enabled to initiate a plurality of web browsing sessions. As such, computing resources of the computing environment 200 utilized by the processing unit 202, the memory unit 204, the I/O unit, and/or the communication unit 208 (and/or any subunit of the aforementioned units) such as processing power, data storage space, network bandwidth, and/or the like may be in high demand at various times during operation. Accordingly, the resource allocation unit 224 may be configured to manage the allocation of various computing resources as they are required by particular units and/or subunits of the computing environment 200 and/or other computing environments. In some embodiments, the resource allocation unit 224 may include sensors and/or other specially-purposed hardware for monitoring performance of each unit and/or subunit of the computing environment 200, as well as hardware for responding to the computing resource needs of each unit and/or subunit. In some embodiments, the resource allocation unit 224 may utilize computing resources of a second computing environment separate and distinct from the computing environment 200 to facilitate a desired operation.

For example, the resource allocation unit 224 may determine a number of simultaneous web content requests stemming from a plurality of secure web containers in a common web browsing session (or in a plurality of web browsing sessions). The resource allocation unit 224 may then determine that the number of simultaneous web content requests meets and/or exceeds a predetermined threshold value. Based on this determination, the resource allocation unit 224 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for enabling safe and efficient operation of the computing environment 200 while supporting the number of simultaneous web content requests, as well as transmission of the web content. The resource allocation unit 224 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 224 may include a volume of web content requests, a size of the web content, a duration of time during which computing resources are required by one or more elements of the computing environment 200, and/or the like. In some embodiments, computing resources may be allocated to and/or distributed amongst a plurality of second computing environments included in the computing environment 200 based on one or more factors mentioned above. In some embodiments, the allocation of computing resources of the resource allocation unit 224 may include the resource allocation unit 224 flipping a switch, adjusting processing power, adjusting memory size, partitioning a memory element, transmitting data, controlling one or more input and/or output devices, modifying various communication protocols, and/or the like. In some embodiments, the resource allocation unit 224 may facilitate utilization of parallel processing techniques such as dedicating a plurality of GPUs included in the processing unit 202 for processing web content requests and/or distribution of web content between multiple units and/or subunits of the computing environment 200 and/or other computing environments.

In some embodiments, the memory unit 204 may be utilized for storing, recalling, receiving, transmitting, and/or accessing various files and/or information during operation of the computing environment 200. The memory unit 204 may include various types of data storage media such as solid state storage media, hard disk storage media, and/or the like. The memory unit 204 may include dedicated hardware elements such as hard drives and/or servers, as well as software elements such as cloud-based storage drives. For example, the memory unit 204 may include various subunits such as an operating system unit 226, an application data unit 228, an application programming interface (API) unit 230, a profile storage unit 232, a content storage unit 234, a cloud storage unit 236, a secure enclave 238, and/or a cache storage unit 240.

The memory unit 204 and/or any of its subunits described herein may include random access memory (RAM), read only memory (ROM), and/or various forms of secondary storage. RAM may be used to store volatile data and/or to store instructions that may be executed by the processing unit 202. For example, the data stored may be a command, a current operating state of the computing environment 200, an intended operating state of the computing environment 200, and/or the like. As a further example, data stored in the memory unit 204 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 204 may include one or more databases (e.g., the cloud-based storage platform, the web servers, the secure web container, the user device, and/or the like) for storing any data described herein. Additionally or alternatively, one or more secondary databases located remotely from the computing environment 200 may be utilized and/or accessed by the memory unit 204.

The operating system unit 226 may facilitate deployment, storage, access, execution, and/or utilization of an operating system utilized by the computing environment 200 and/or any other computing environment described herein (e.g., a user device, a secure web container, a web server, a cloud-based storage platform, and/or a translation service). In some embodiments, the operating system may include various hardware and/or software elements that serve as a structural framework for enabling the processing unit 202 to execute various operations described herein. The operating system unit 226 may further store various pieces of information and/or data associated with operation of the operating system and/or the computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by the computing environment 200 and/or any other computing environment described herein (e.g., a user device, a secure web container, a web server, a cloud-based storage platform, and/or a translation service). For example, users may be required to download, access, and/or otherwise utilize a software application on a user device such as a smartphone in order for various operations described herein to be performed. As such, the application data unit 228 may store any information and/or data associated with the application (e.g., web browser, secure analysis application, secure web container, and/or the like). Information included in the application data unit 228 may enable a user to execute various operations described herein. The application data unit 228 may further store various pieces of information and/or data associated with operation of the application and/or the computing environment 200 as a whole, such as a status of computing resources (e.g., processing power, memory availability, resource utilization, and/or the like), runtime information, modules to direct execution of operations described herein, user permissions, security credentials, and/or the like.

The API unit 230 may facilitate deployment, storage, access, execution, and/or utilization of information associated with APIs of the computing environment 200 and/or any other computing environment described herein (e.g., a user device). For example, computing environment 200 may include one or more APIs for enabling various devices, applications, and/or computing environments to communicate with each other and/or utilize the same data. Accordingly, the API unit 230 may include API databases containing information that may be accessed and/or utilized by applications and/or operating systems of other devices and/or computing environments. In some embodiments, each API database may be associated with a customized physical circuit included in the memory unit 204 and/or the API unit 230. Additionally, each API database may be public and/or private, and so authentication credentials may be required to access information in an API database.

The profile storage unit 232 may facilitate deployment, storage, access, and/or utilization of information associated with user profiles of users by the computing environment 200 and/or any other computing environment described herein (e.g., a user device, a secure web container, a web server, a cloud-based storage platform, and/or a translation service). For example, the profile storage unit 232 may store one or more user's contact information, authentication credentials, user preferences, user history and/or log of behavior, personal information, location information, received input and/or sensor data, and/or metadata. In some embodiments, the profile storage unit 232 may communicate with the profile management unit 210 to receive and/or transmit information associated with a user's profile.

The content storage unit 234 may facilitate deployment, storage, access, and/or utilization of information associated with requested content by the computing environment 200 and/or any other computing environment described herein (e.g., a user device, a secure web container, a web server, a cloud-based storage platform, and/or a translation service). For example, the content storage unit 234 may store web content (e.g., one or more images, text, videos, audio content, advertisements, and/or metadata) to be presented to a user and/or processed during operations described herein. The content storage unit 234 may store web content that may be recalled by the secure web containers, the user device, and/or the web servers during operations described herein. In some embodiments, the content storage unit 234 may communicate with the content management unit 212 to receive and/or transmit content files from the web servers.

The cloud storage unit 236 may facilitate deployment, storage, access, analysis, and/or utilization of web content, user information, location information, and/or the like in a cloud-based storage platform as described herein. For example, the cloud storage unit 236 may store web content generated, transmitted, received, and/or stored by the computing environment 200. In some embodiments, the cloud storage unit 236 may communicate with the GPUs 216, the traffic routing unit 218, the translation unit 220, and/or the storage mapping unit 222 to facilitate storage and/or recall of web content and/or other information stored in the cloud storage unit 236.

The secure enclave 238 may facilitate secure storage of data. In some embodiments, the secure enclave 238 may include a partitioned portion of storage media included in the memory unit 204 that is protected by various security measures. For example, the secure enclave 238 may be hardware secured. In other embodiments, the secure enclave 238 may include one or more firewalls, encryption mechanisms, and/or other security-based protocols. Authentication credentials of a user may be required prior to providing the user access to data stored within the secure enclave 238. The secure enclave 238 may include and/or be included in the encrypted data stores and/or any other data store described herein.

The cache storage unit 240 may facilitate short-term deployment, storage, access, analysis, and/or utilization of data. For example, the cache storage unit 248 may serve as a short-term storage location for data so that the data stored in the cache storage unit 248 may be accessed quickly. In some embodiments, the cache storage unit 240 may include RAM and/or other storage media types that enable quick recall of stored data. The cache storage unit 240 may included a partitioned portion of storage media included in the memory unit 204.

As described herein, the memory unit 204 and its associated elements may store any suitable information. Any aspect of the memory unit 204 may comprise any collection and arrangement of volatile and/or non-volatile components suitable for storing data. For example, the memory unit 204 may comprise random access memory (RAM) devices, read only memory (ROM) devices, magnetic storage devices, optical storage devices, and/or any other suitable data storage devices. In particular embodiments, the memory unit 204 may represent, in part, computer-readable storage media on which computer instructions and/or logic are encoded. The memory unit 204 may represent any number of memory components within, local to, and/or accessible by a processor.

The I/O unit 206 may include hardware and/or software elements for enabling the computing environment 200 to receive, transmit, and/or present information. For example, elements of the I/O unit 206 may be used to receive user input from a user via a user device, present web content to the user via the user device, and/or the like. In this manner, the I/O unit 206 may enable the computing environment 200 to interface with a human user. As described herein, the I/O unit 206 may include subunits such as an I/O device 242, an I/O calibration unit 244, and/or video driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, the I/O device 242 may include one or more elements of a user device, a computing system, a server, and/or a similar device.

The I/O device 242 may include a variety of elements that enable a user to interface with the computing environment 200. For example, the I/O device 242 may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device 242 may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of the processing unit 202 and/or the memory unit 204 to execute operations described herein. For example, the I/O device 242 may include a display, which may utilize the GPU 216 to present web content to a user of a user device.

The I/O calibration unit 244 may facilitate the calibration of the I/O device 242. For example, the I/O calibration unit 244 may detect and/or determine one or more settings of the I/O device 242, and then adjust and/or modify settings so that the I/O device 242 may operate more efficiently.

In some embodiments, the I/O calibration unit 244 may utilize a video driver 246 (or multiple video drivers) to calibrate the I/O device 242. For example, the video driver 246 may be installed on a user device so that the user device may recognize and/or integrate with the I/O device 242, thereby enabling web content to be displayed, received, generated, and/or the like. In some embodiments, the I/O device 242 may be calibrated by the I/O calibration unit 244 by based on information included in the video driver 246.

The communication unit 208 may facilitate establishment, maintenance, monitoring, and/or termination of communications (e.g., a video streaming connection and/or distribution of political content) between the computing environment 200 and other devices such as user devices, the secure analysis application, the secure web containers, the egress nodes, the web servers, the cloud-based storage platform, the translation service, other computing environments, third party server systems, and/or the like. The communication unit 208 may further enable communication between various elements (e.g., units and/or subunits) of the computing environment 200. In some embodiments, the communication unit 208 may include a network protocol unit 248, an API gateway 250, an encryption engine 252, and/or a communication device 254. The communication unit 208 may include hardware and/or software elements. In some embodiments, the communication unit 208 may be utilized to transmit and/or receive web content as described herein.

The network protocol unit 248 may facilitate establishment, maintenance, and/or termination of a communication connection between the computing environment 200 and another device by way of a network. For example, the network protocol unit 248 may detect and/or define a communication protocol required by a particular network and/or network type. Communication protocols utilized by the network protocol unit 248 may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment 200 and any other device, as well as any element internal to the computing environment 200, may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a web browsing session, a network connection, distributing web content, transmitting data, and/or performing other operations described herein.

The API gateway 250 may facilitate the enablement of other devices and/or computing environments to access the API unit 230 of the memory unit 204 of the computing environment 200. For example, a user device may access the API unit 230 via the API gateway 250. In some embodiments, the API gateway 250 may be required to validate user credentials associated with a user of a user device prior to providing access to the API unit 230 to the user. The API gateway 250 may include instructions for enabling the computing environment 200 to communicate with another device.

The encryption engine 252 may facilitate translation, encryption, encoding, decryption, and/or decoding of information received, transmitted, and/or stored by the computing environment 200. Using the encryption engine, each transmission of data may be encrypted, encoded, and/or translated for security reasons, and any received data may be encrypted, encoded, and/or translated prior to its processing and/or storage. In some embodiments, the encryption engine 252 may generate an encryption key, an encoding key, a translation key, and/or the like, which may be transmitted along with any data content.

The communication device 254 may include a variety of hardware and/or software specifically purposed to enable communication between the computing environment 200 and another device, as well as communication between elements of the computing environment 200. In some embodiments, the communication device 254 may include one or more radio transceivers, chips, analog front end (AFE) units, antennas, processing units, memory, other logic, and/or other components to implement communication protocols (wired or wireless) and related functionality for facilitating communication between the computing environment 200 and any other device. Additionally and/or alternatively, the communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory) such as DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

Networked computing environment such as those provided by a communications server may include, but are not limited to, computing grid systems, distributed computing environments, cloud computing environment, etc. Such networked computing environments include hardware and software infrastructures configured to form a virtual organization comprised of multiple resources which may be in geographically disperse locations.

In some embodiments, the network described herein may include any wireless and/or wired communications network that facilitates communication (e.g., transmission and/or receipt of between the computing environment 200 and any other device. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

User Interface

Figure 3:
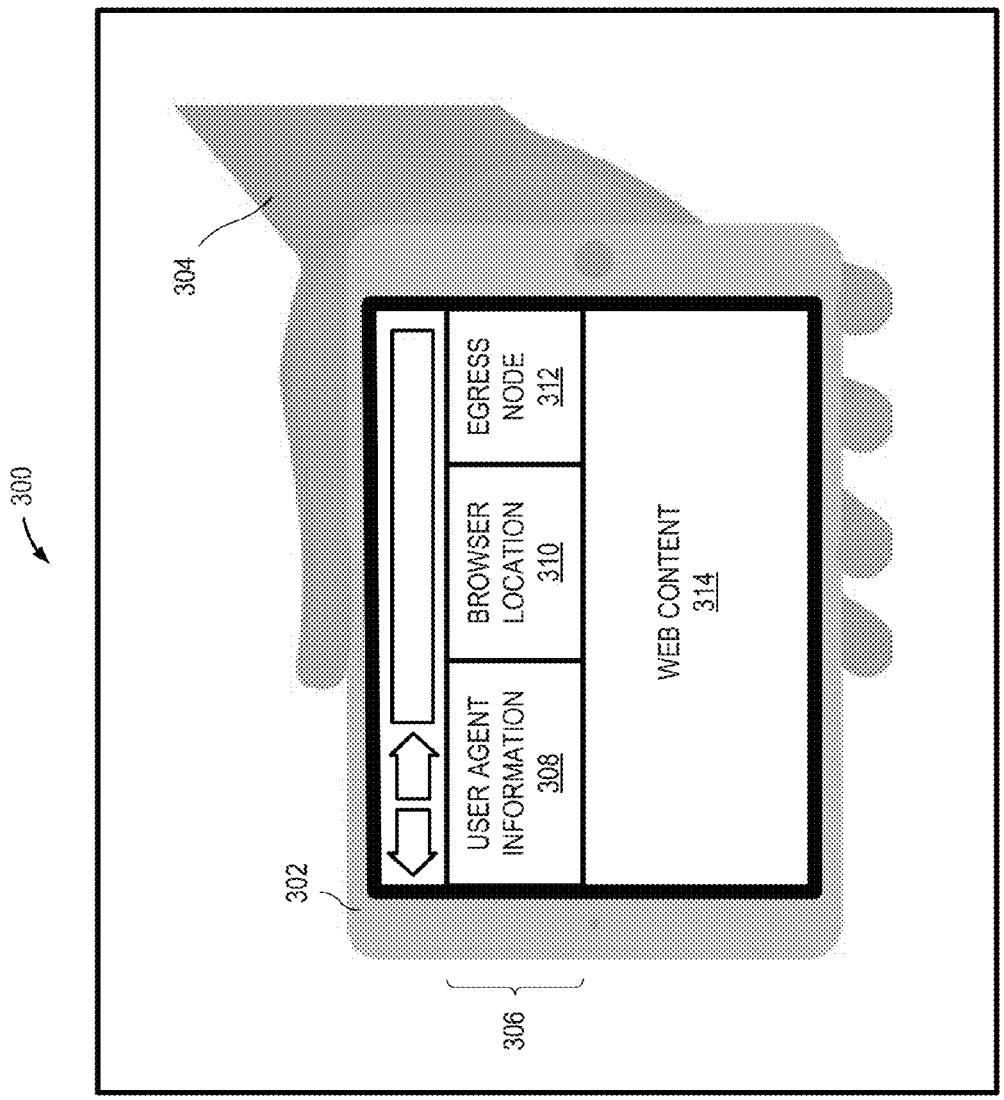
FIG. 3 shows an exemplary user interface of a secure web browsing experience, in accordance with some embodiments of the disclosure.

Referring now to FIG. 3, FIG. 3 shows an exemplary graphical interface 300 for a secure analysis application that may be presented on a user device 302 of a user 304. A user may instantiate multiple secure web containers in one common session of the secure analysis application. Each secure web container may correspond with a window displayed within a client agent and/or interface running on the user device 302 and associated with the secure analysis application.

As discussed above, the different secure web containers may have distinct configuration settings. As shown in FIG. 3, these configuration settings may be displayed within each window in a message bar 306 to allow the user 304 to track each browsing session more carefully. In some embodiments, the message bar 306 may include information associated with the session such as user agent information 308 (and/or other aspects of the browser fingerprint), a browser location 310 (e.g., the IP address and/or the regional location of the selected secure web container), and an egress node 312 location (e.g., the IP address and/or the regional location of the selected egress node). The user may adjust some or all of these settings by interacting with the message bar 306. Some settings, such as those pertaining to the egress node 312 may be adjusted before initiating a session, and some settings, such as the operating system, type of web browser and/or other user agent information 308 may be may be adjusted either before or during the session. In some embodiments, some or all of these settings may be predefined and fixed by a system administrator. In general, as a user may have multiple secure analysis application sessions and/or multiple secure web containers open simultaneously, the message bar 306 may help the user remember and preserve the separation of each session. Once a connection has been established between the user device 302 and a web server (e.g., a provider of content), web content 314 may be displayed on the user device 302.

Method Descriptions

Figure 4:
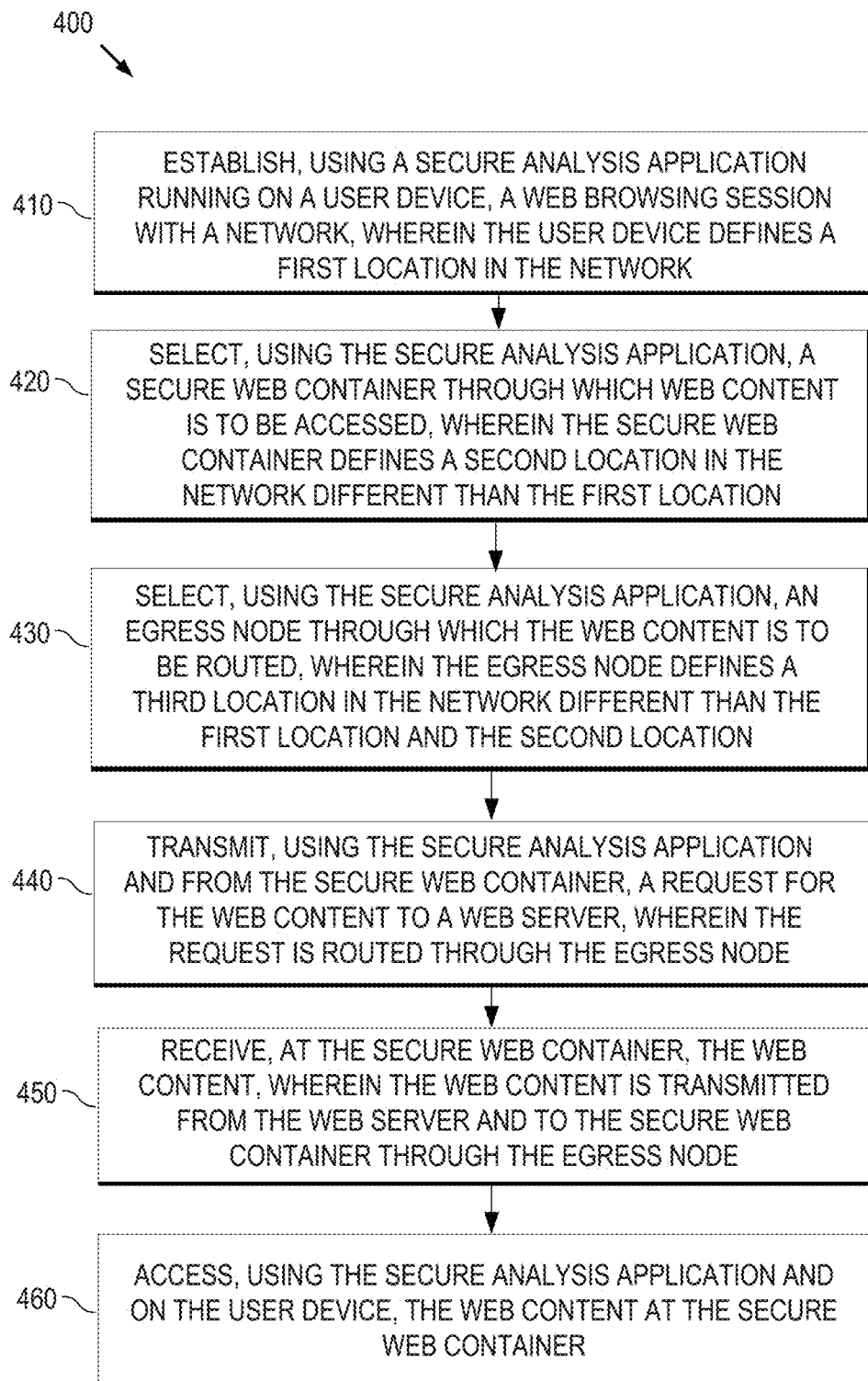
FIG. 4 shows an exemplary process flow for securely accessing web content, in accordance with some embodiments of the disclosure.

FIG. 4 shows an exemplary method 400 for performing operations associated with securely accessing web content as described herein. At block 410, the method 400 may include establishing, using a secure analysis application running on a user device, a web browsing session with a network, wherein the user device defines a first location in the network. At block 420, the method 400 may include selecting, using the secure analysis application, a secure web container through which web content is to be accessed, wherein the secure web container defines a second location in the network different than the first location. At block 430, the method 400 may include selecting, using the secure analysis application, an egress node through which the web content is to be routed, wherein the egress node defines a third location in the network different than the first location and the second location. At block 440, the method 400 may include transmitting, using the secure analysis application and from the secure web container, a request for the web content to a web server, wherein the request is routed through the egress node. At block 450, the method 400 may include receiving, at the secure web container, the web content, wherein the web content is transmitted from the web server and to the secure web container through the egress node. At block 460, the method 400 may include accessing, using the secure analysis application and on the user device, the web content at the secure web container.

Figure 5:
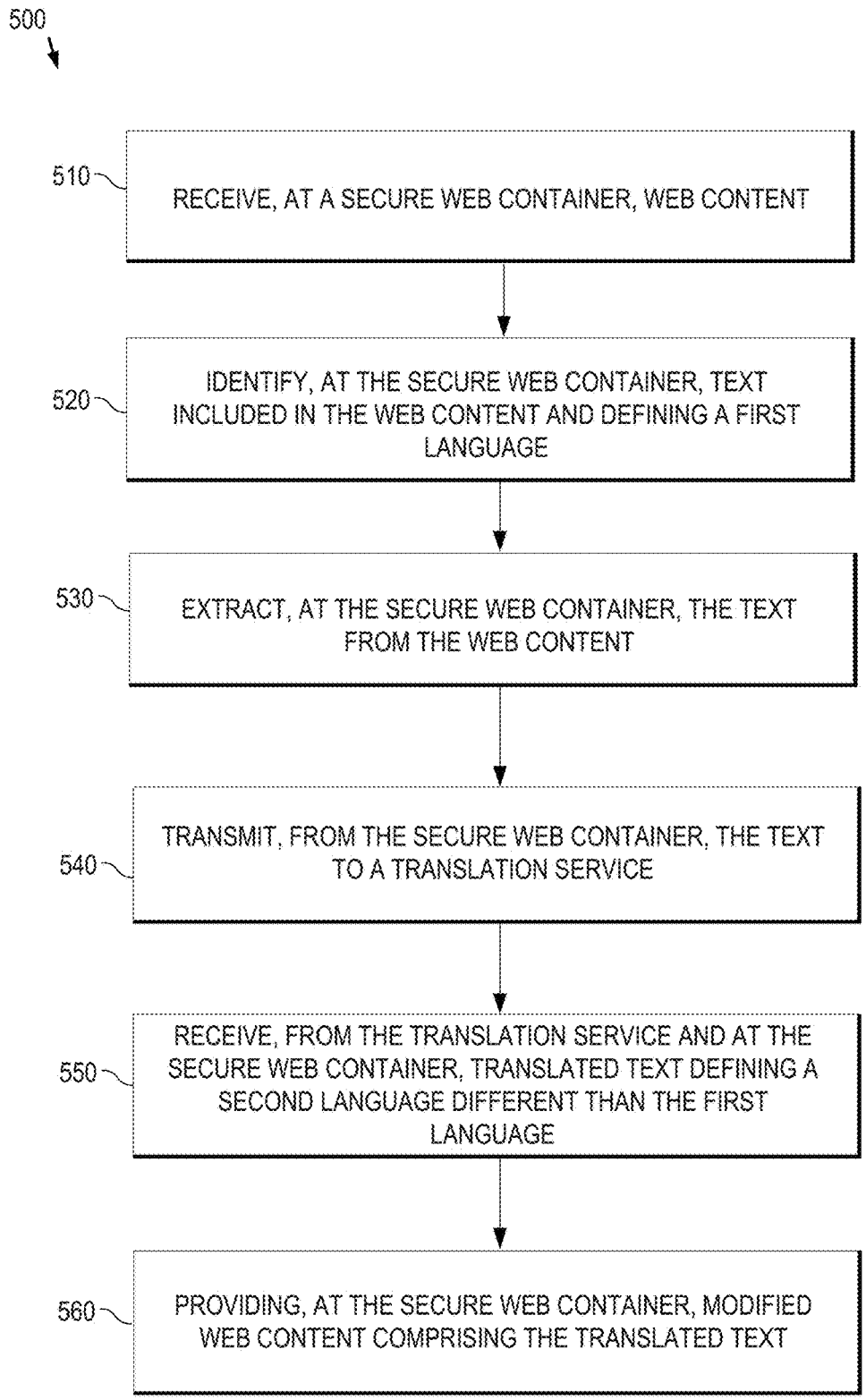
FIG. 5 shows an exemplary process flow for translating text included in web content, in accordance with some embodiments of the disclosure.

FIG. 5 shows an exemplary method 500 for performing operations associated with translating web content obtained at an "arm's length" in a secure browsing session as described herein. At block 510, the method 500 may include receiving, at a secure web container, web content. At block 520, the method 500 may include identifying, at the secure web container, text included in the web content and defining a first language. At block 530, the method 500 may include extracting, at the secure web container, the text from the web content. At block 540, the method 500 may include transmitting, from the secure web container, the text to a translation service. At block 550, the method 500 may include receiving, from the translation service and at the secure web container, translated text defining a second language different than the first language. At block 560, the method 500 may include providing, at the secure web container, modified web content comprising the translated text.

Figure 6:
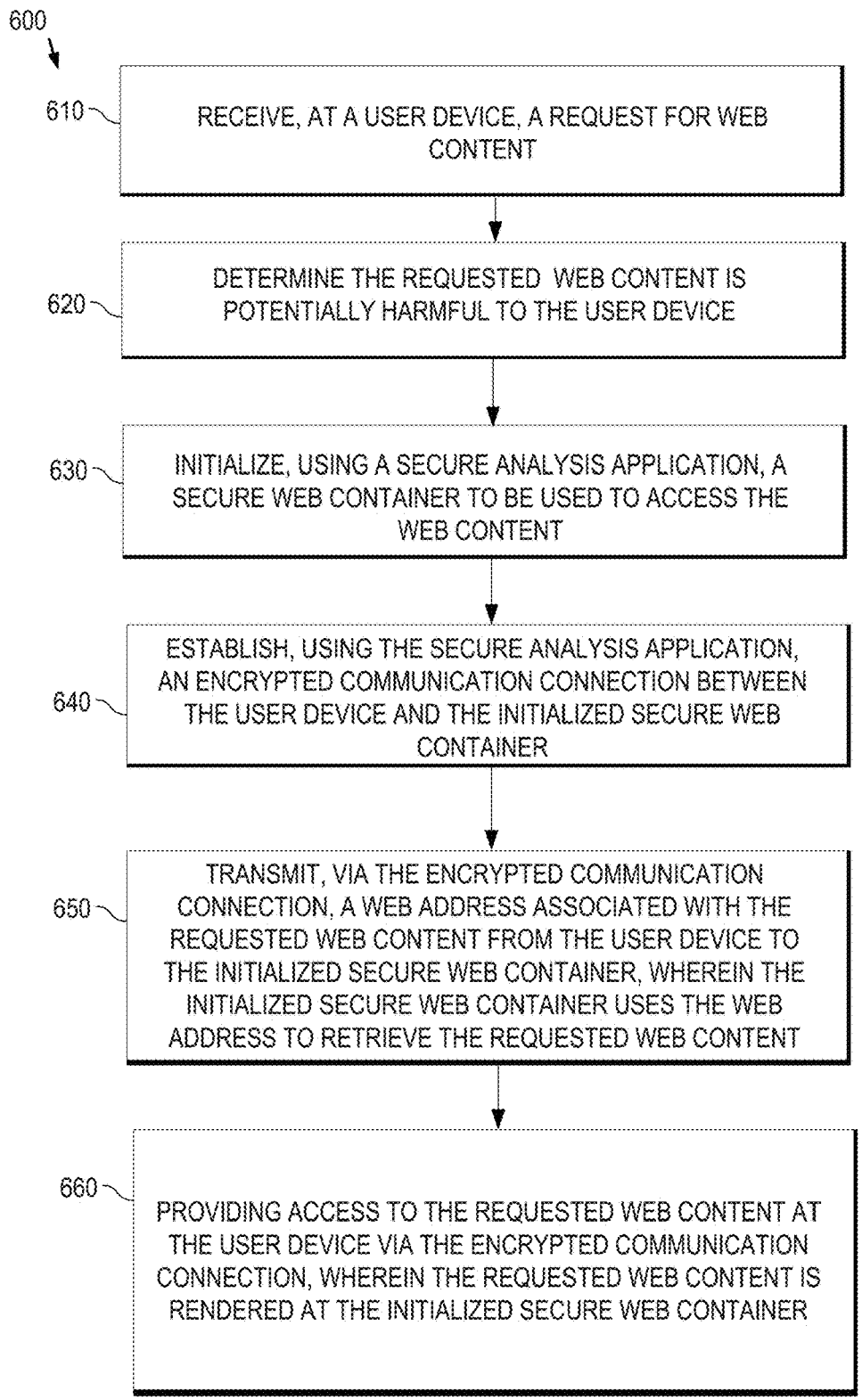
FIG. 6 shows an exemplary process flow for securely accessing web content using URL forwarding, in accordance with some embodiments of the disclosure.

FIG. 6 shows an exemplary method 600 for performing operations associated with utilizing URL forwarding to initiate a secure web browsing session as described herein. At block 610, the method 600 may include receiving, at a user device, a request for web content. At block 620, the method 600 may include determining the requested web content is potentially harmful to the user device. At block 630, the method 600 may include initializing, using a secure analysis application, a secure web container to be used to access the web content. At block 640, the method 600 may include establishing, using the secure analysis application, an encrypted communication connection between the user device and the initialized secure web container. At block 650, the method 600 may include transmitting, via the encrypted communication connection, a web address associated with the requested web content from the user device to the initialized secure web container, wherein the initialized secure web container uses the web address to retrieve the requested web content. At block 660, the method 600 may include providing access to the requested web content at the user device via the encrypted communication connection, wherein the requested web content is rendered at the initialized secure web container.

FURTHER COMMENTS

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A computing apparatus located in a first location in a network and comprising:
    at least one memory comprising instructions; and
    at least one processing device configured for executing the instructions, wherein the instructions cause the at least one processing device to perform operations of:
        receiving, by an input/output (I/O) unit of the computing apparatus, a request for web content;
        determining, by a secure analysis application, the requested web content is potentially harmful to the computing apparatus;
        selecting, by the secure analysis application, the secure web container from a plurality of secure web containers and an egress node from a plurality of egress nodes, based at least in part on the requested web content;
        transmitting, by a communication unit of the computing apparatus, a web address associated with the requested web content to the secure web container located in a second location in the network, wherein the secure web container uses the web address to retrieve the requested web content from a web server; and
        providing, in a secure browser associated with the secure analysis application and at the computing apparatus, access to the requested web content via an encrypted communication connection established between the computing apparatus and the secure web container, wherein the requested web content is rendered by the secure web container so that the computing apparatus is not exposed to the rendered web content,
    wherein the egress node is located in a third location in the network.

2. The computing apparatus of claim 1, wherein the instructions further cause the at least one processing device to perform the operations of:
    initializing, by the secure analysis application, the secure web container for retrieving the requested web content via the egress node; and
    establishing, by the communication unit, the encrypted communication connection between the computing apparatus and the secure web container, wherein the web address associated with the requested web content is transmitted from the computing apparatus to the secure web container via the encrypted communication connection.

3. The computing apparatus of claim 2, wherein the secure web container comprises multiple secure web containers located in different locations in the network, wherein the egress node comprises multiple egress nodes located in different locations in the network, and wherein each secure web container and each egress node is utilized to retrieve the requested web content from the web server.

4. The computing apparatus of claim 1, wherein the request for web content is received at the computing apparatus in an unsecure browser window different from a window associated with the secure browser.

5. The computing apparatus of claim 1, wherein determining the requested web content is potentially harmful to the computing apparatus comprises:
    identifying, using the secure analysis application, the web address associated with the requested web content;

comparing, using the secure analysis application, the identified web address to a plurality of web addresses associated with potentially harmful web content; and determining, using the secure analysis application, at least a partial match between the identified web address and the plurality of web addresses associated with potentially harmful web content.

6. The computing apparatus of claim 1, wherein determining the requested web content is potentially harmful to the computing apparatus comprises:

identifying, using the secure analysis application, the web address associated with the requested web content;

comparing, using the secure analysis application, the identified web address to a plurality of web addresses associated with safe web content;

determining, using the secure analysis application, no match between the identified web address and the plurality of web addresses associated with safe web content; and adding, using the secure analysis application, the identified web address to a database comprising the plurality of web addresses associated with potentially harmful web content.

7. The computing apparatus of claim 1, wherein determining the requested web content is potentially harmful to the computing apparatus comprises:

determining, using the secure analysis application, a risk level associated with the requested web content;

comparing, using the secure analysis application, the determined risk level to a threshold value associated with an accepted risk level; and determining, using the secure analysis application, the determined risk level exceeds the threshold value.

8. A non-transitory computer readable medium comprising code, wherein the code, when executed by at least one processing device of a computing apparatus located in a first location in a network, causes the at least one processing device to perform operations of:

receiving, by an input/output (I/O) unit of the computing apparatus, a request for web content;

determining, by a secure analysis application, the requested web content is potentially harmful to the computing apparatus;

selecting, by the secure analysis application, the secure web container from a plurality of secure web containers and an egress node from a plurality of egress nodes, based at least in part on the requested web content;

transmitting, by a communication unit of the computing apparatus, a web address associated with the requested web content to the secure web container located in a second location in the network, wherein the secure web container uses the web address to retrieve the requested web content from a web server; and providing, in a secure browser window associated with the secure analysis application and at the computing apparatus, access to the requested web content via an encrypted communication connection established between the computing apparatus and the secure web container, wherein the requested web content is rendered by the secure web container so that the computing apparatus is not exposed to the rendered web content, wherein the egress node is located in a third location in the network.

9. The non-transitory computer readable medium of claim 8, wherein the code, when executed by the at least one processing device of the computing apparatus, causes the at least one processing device to perform operations of:

initializing, by the secure analysis application, the secure web container for retrieving the requested web content via the egress node; and establishing, by the communication unit, the encrypted communication connection between the computing apparatus and the secure web container, wherein the web address associated with the requested web content is transmitted from the computing apparatus to the secure web container via the encrypted communication connection.

10. The non-transitory computer readable medium of claim 9, wherein the secure web container comprises multiple secure web containers located in different locations in the network, wherein the egress node comprises multiple egress nodes located in different locations in the network, and wherein each secure web container and each egress node is utilized to retrieve the requested web content from the web server.

11. The non-transitory computer readable medium of claim 8, wherein the request for web content is received at the computing apparatus in an unsecure browser window different from a window associated with the secure browser.

12. The non-transitory computer readable medium of claim 8, wherein the code that, when executed by the at least one processing device of the computing apparatus, causes the at least one processing device to perform the operation of determining the requested web content is potentially harmful to the computing apparatus further comprises code that, when executed by the at least one processing device of the computing apparatus, causes the at least one processing device to perform operations of:

identifying, using the secure analysis application, the web address associated with the requested web content;

comparing, using the secure analysis application, the identified web address to a plurality of web addresses associated with potentially harmful web content; and determining, using the secure analysis application, at least a partial match between the identified web address and the plurality of web addresses associated with potentially harmful web content.

13. The non-transitory computer readable medium of claim 8, wherein the code that, when executed by the at least one processing device of the computing apparatus, causes the at least one processing device to perform the operation of determining the requested web content is potentially harmful to the computing apparatus further comprises code that, when executed by the at least one processing device of the computing apparatus, causes the at least one processing device to perform operations of:

identifying, using the secure analysis application, the web address associated with the requested web content;

comparing, using the secure analysis application, the identified web address to a plurality of web addresses associated with safe web content;

determining, using the secure analysis application, no match between the identified web address and the plurality of web addresses associated with safe web content; and adding, using the secure analysis application, the identified web address to a database comprising the plurality of web addresses associated with potentially harmful web content.

14. The non-transitory computer readable medium of claim 8, wherein the code that, when executed by the at least one processing device of the computing apparatus, causes the at least one processing device to perform the operation of determining the requested web content is potentially harmful to the computing apparatus further comprises code that, when executed by the at least one processing device of the computing apparatus, causes the at least one processing device to perform operations of:

determining, using the secure analysis application, a risk level associated with the requested web content;

comparing, using the secure analysis application, the determined risk level to a threshold value associated with an accepted risk level; and determining, using the secure analysis application, the determined risk level exceeds the threshold value.

15. A method comprising:

receiving, by an input/output (I/O) unit of a computing apparatus located in a first location in a network, a request for web content;

determining, by a secure analysis application, the requested web content is potentially harmful to the computing apparatus;

selecting the secure web container from a plurality of secure web containers, and an egress node from a plurality of egress nodes based at least in part on the requested web content;

transmitting, by a communication unit of the computing apparatus, a web address associated with the requested web content to the secure web container located in a second location in the network, wherein the secure web container uses the web address to retrieve the requested web content from a web server; and providing, in a secure browser window associated with the secure analysis application and at the computing apparatus, access to the requested web content via an encrypted communication connection established between the computing apparatus and the secure web container, wherein the requested web content is rendered by the secure web container so that the computing apparatus is not exposed to the rendered web content, wherein the egress node is located in a third location in the network.

16. The method of claim 15, wherein the method further comprises:

initializing, by the secure analysis application, the secure web container for retrieving the requested web content via the egress node; and establishing, by the communication unit, the encrypted communication connection between the computing apparatus and the secure web container, wherein the web address associated with the requested web content is transmitted from the computing apparatus to the secure web container via the encrypted communication connection.

17. The method of claim 16, wherein the secure web container comprises multiple secure web containers located in different locations in the network, wherein the egress node comprises multiple egress nodes located in different locations in the network, and wherein each secure web container and each egress node is utilized to retrieve the requested web content from the web server.

18. The method of claim 15, wherein the request for web content is received at the computing apparatus in an unsecure browser window different from a window associated with the secure browser.

19. The method of claim 15, determining the requested web content is potentially harmful to the computing apparatus comprises:

identifying, using the secure analysis application, the web address associated with the requested web content;

comparing, using the secure analysis application, the identified web address to a plurality of web addresses associated with potentially harmful web content; and determining, using the secure analysis application, at least a partial match between the identified web address and the plurality of web addresses associated with potentially harmful web content.

20. The method of claim 15, wherein determining the requested web content is potentially harmful to the computing apparatus comprises:

identifying, using the secure analysis application, the web address associated with the requested web content;

comparing, using the secure analysis application, the identified web address to a plurality of web addresses associated with safe web content;

determining, using the secure analysis application, no match between the identified web address and the plurality of web addresses associated with safe web content; and adding, using the secure analysis application, the identified web address to a database comprising the plurality of web addresses associated with potentially harmful web content.

\* \* \* \* \*